US009208016B2

(12) United States Patent
Nagata et al.

(10) Patent No.: US 9,208,016 B2
(45) Date of Patent: Dec. 8, 2015

(54) MESSAGE SEQUENCE GENERATION METHOD AND MESSAGE SEQUENCE GENERATION DEVICE

(75) Inventors: Tomoyuki Nagata, Tokyo (JP); Tsutomu Yamaji, Tokyo (JP); Yasuhide Ueno, Tokyo (JP); Misayo Fujioka, Tokyo (JP); Satoshi Harauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 141 days.

(21) Appl. No.: 14/009,668

(22) PCT Filed: Nov. 18, 2011

(86) PCT No.: PCT/JP2011/076676
§ 371 (c)(1),
(2), (4) Date: Oct. 3, 2013

(87) PCT Pub. No.: WO2012/137385
PCT Pub. Date: Oct. 11, 2012

(65) Prior Publication Data
US 2014/0032963 A1    Jan. 30, 2014

(30) Foreign Application Priority Data

Apr. 4, 2011   (JP) .................................. 2011-082446

(51) Int. Cl.
*G06F 11/00* (2006.01)
*G06F 11/07* (2006.01)
(Continued)

(52) U.S. Cl.
CPC .......... *G06F 11/0793* (2013.01); *G06F 11/079* (2013.01); *G06F 11/3664* (2013.01); *H04L 41/069* (2013.01); *H04L 69/40* (2013.01); *G06F 8/10* (2013.01)

(58) Field of Classification Search
CPC ... G06F 19/12; G06F 11/079; G06F 11/0793; G06F 9/455; G06F 11/3664
See application file for complete search history.

(56) References Cited

U.S. PATENT DOCUMENTS 6,704,800 B1 *   3/2004   Lee et al. ...................... 719/313
8,539,283 B2 *   9/2013   Kady et al. ................... 714/38.1

FOREIGN PATENT DOCUMENTS

JP    5 56104       3/1993
JP    5 233327      9/1993

(Continued)

OTHER PUBLICATIONS

Terauchi, A., et al, "Efficient Development for Communications Services by using MSCs and Rules", National Convention of Information Processing Society of Japan, vol. 1, pp. 263-264, (Sep. 20, 1994).

(Continued)

*Primary Examiner* — Charles Ehne
(74) *Attorney, Agent, or Firm* — Oblon, McClelland, Maier & Neustadt, L.L.P.

(57) ABSTRACT

A message sequence generation method and a message sequence generation device, by which a message sequence with an error handling added thereto can be efficiently generated. The method includes setting an action for a specific phenomenon in the phenomenon causal relationship model, associating each element included in the message sequence information with each phenomenon to generate element/phenomenon correspondence information, storing the element/phenomenon correspondence information into a memory device, and acquiring the action set for the phenomenon corresponding to each element and the action set for another phenomenon caused by the phenomenon, from the element/phenomenon correspondence information, and adding the actions to the element as an error handling.

8 Claims, 29 Drawing Sheets

(51) Int. Cl.
*G06F 11/36* (2006.01)
*H04L 29/14* (2006.01)
*H04L 12/24* (2006.01)
*G06F 9/44* (2006.01)

(56) References Cited

FOREIGN PATENT DOCUMENTS

| JP | 6 152701 | 5/1994 |
|---|---|---|
| JP | 9 233150 | 9/1997 |
| JP | 2001 195470 | 7/2001 |
| JP | 2002 268713 | 9/2002 |
| JP | 2004 126641 | 4/2004 |
| JP | 2006 85668 | 3/2006 |
| JP | 2010 224956 | 10/2010 |

OTHER PUBLICATIONS

Fukuzawa, Y., et al., "A Method for Keeping Coherency Between Message Sequence Charts and State Transition Table", IEICE, vol. 93, No. 486, pp. 1-6, (Feb. 1994).

International Search Report Issued Jan. 10, 2012 in PCT/JP11/076676 Filed Nov. 18, 2011.

International Preliminary Report on Patentability issued Oct. 17, 2013 in PCT/JP2011/076676 filed on Nov. 18, 2011(English translation only).

Written Opinion issued Jan. 10, 2012 in PCT/JP2011/076676 filed on Nov. 18, 2011 (with English translation).

* cited by examiner

F I G. 6
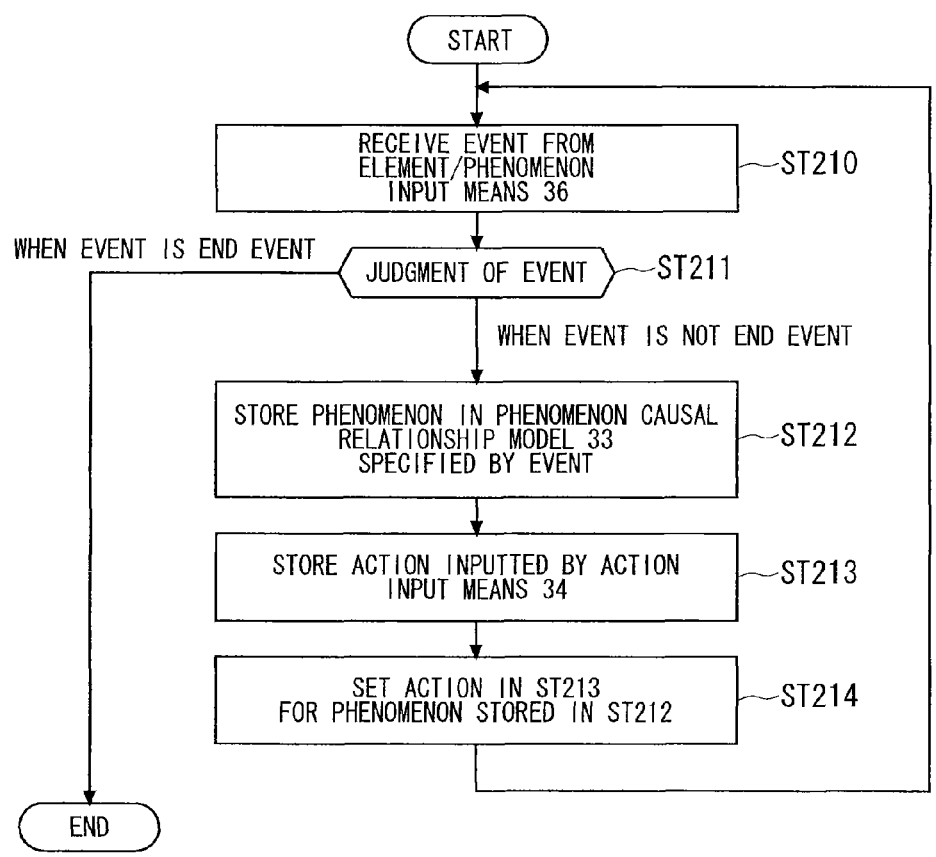

F I G. 1 9

| No | PHENOMENON NAME | ACTION | EXECUTION CONDITION | CONFIGURATION CONTROL CONDITION |
|---|---|---|---|---|
| 1 | SWITCHING OF SYSTEM | ACTION 1 | — | SELF-MODE: REGULAR AND OTHER PARTY'S MODE: BACKUP |
| ... | ... | ... | ... | ... |

<DEVICE INFORMATION>

| No | NAME | CLASS | IP ADDRESS |
|---|---|---|---|
| 1 | server1 | SUPERVISORY CONTROL SERVER | 192.168.0.1 |
| 2 | server2 | SUPERVISORY CONTROL SERVER | 192.168.0.2 |
| ... | | | |

<MODE STATUS COMBINATION INFORMATION>

| SERVER 1 \ SERVER 2 | REGULAR | STANDBY | MAINTENANCE |
|---|---|---|---|
| REGULAR | NG | OK | OK |
| STANDBY | OK | NG | NG |
| MAINTENANCE | OK | NG | NG |

<MODE STATUS TRANSITION INFORMATION>

FIG. 30

<ELEMENT DEFINITION INFORMATION>

| ELEMENT | GROUP 1 | GROUP 2 | ... | GROUP n |
|---|---|---|---|---|
| RECEPTION OF SELECTION MESSAGE | MESSAGE | SELECTION/ CONTROL MESSAGE | | — |
| RECEPTION OF CONTROL MESSAGE | MESSAGE | SELECTION/ CONTROL MESSAGE | | — |

FIG. 31

<PHENOMENON DEFINITION INFORMATION>

| PHENOMENON | GROUP 1 | GROUP 2 | ... | GROUP n |
|---|---|---|---|---|
| ABNORMAL CONDITIONS IN BOTH LAN SYSTEMS | FAILURE | COMMUNICATION BREAKDOWN | | — |
| PARITY CHECK VIOLATION | WRONG MESSAGE | — | | — |

FIG. 32

<PHENOMENON/EVENT CORRESPONDENCE DEFINITION INFORMATION>

| PHENOMENON | CORRESPONDING ELEMENT 1 (S1) | CORRESPONDING ELEMENT 2 (S2) | ... | CORRESPONDING ELEMENT n (Sn) | LOGICAL EXPRESSION |
|---|---|---|---|---|---|
| ABNORMAL CONDITIONS IN BOTH LAN SYSTEMS | ALL (ELEMENTS) | — | | — | S1 |
| PARITY CHECK VIOLATION | RECEPTION OF ALL (MESSAGES) | — | | — | S1 |

FIG. 33

<ACTION/PHENOMENON CORRESPONDENCE DEFINITION INFORMATION>

| ACTION | CORRESPONDING PHENOMENON 1 (J1) | CORRESPONDING PHENOMENON 2 (J2) | ... | CORRESPONDING PHENOMENON n (Jn) | LOGICAL EXPRESSION |
|---|---|---|---|---|---|
| ACTION 1 | ALL (COMMUNICATION BREAKDOWN) | — | | — | S1 |
| ACTION 2 | ALL (WRONG MESSAGES) | — | | — | S1 |

# MESSAGE SEQUENCE GENERATION METHOD AND MESSAGE SEQUENCE GENERATION DEVICE

TECHNICAL FIELD

The present invention relates to a message sequence generation method and a message sequence generation device used for generating a message sequence diagram describing specifications of a communication protocol.

BACKGROUND ART

In supervisory control systems or the like, specifications of a communication protocol are mostly described by using a message sequence diagram. A method for generating an executable program is proposed, in which not only normal procedures but also error handling procedures are described by using a message sequence diagram.

In a communication protocol, generally, there are more error handling procedures than normal procedures. For this reason, there is a demand for a method of efficiently creating a message sequence diagram for procedures at the occurrence of an error.

In Patent Document 1, proposed is a message sequence generation device in which a message sequence with an error handling procedure added thereto is generated from a normal sequence indicating a sequence at a normal condition and rules describing conditions causing errors and error handling procedures therefor.

In Patent Document 2, proposed is a software development support device for generating whole specifications by adding abnormal specifications to normal specifications which are given as an input and combining these specifications.

PRIOR-ART DOCUMENTS

Patent Documents

[Patent Document 1] Japanese Patent Application Laid Open Gazette No. 6-152701
[Patent Document 2] Japanese Patent Application Laid Open Gazette No. 2006-85668

DISCLOSURE OF INVENTION

Problems to be Solved by the Invention

The method disclosed in Patent Document 1, however, has a problem that in a case where there are many kinds of messages and many statuses, the number of rules to be described increases and it is therefore not possible to efficiently generate a message sequence diagram describing abnormal specifications.

Further, in the method disclosed in Patent Document 2, there is no disclosure of any means for adding the abnormal specifications to the message sequence diagram indicating the normal specifications and combining these specifications. For this reason, in this method, disadvantageously, it is not possible to generate a message sequence diagram in which the abnormal specifications are added to the normal specifications.

The present invention is intended to solve the above problems, and it is an object of the present invention to provide a message sequence generation method and a message sequence generation device, by which a message sequence with an error handling added thereto can be efficiently generated.

Means for Solving the Problems

The present invention is intended for a message sequence generation method. According to the present invention, the message sequence generation method includes the steps of (a) preparing message sequence information indicating a normal procedure of a communication protocol by using a message sequence diagram, for data processing; (b) preparing a phenomenon causal relationship model describing a plurality of phenomena including a phenomenon which requires an error handling together with a causal relationship thereof, for data processing; (c) setting an action for a specific phenomenon in the phenomenon causal relationship model, the action being performed when the specific phenomenon occurs; (d) associating each element in the message sequence information with each of the phenomena to generate element/phenomenon correspondence information; (e) storing the element/phenomenon correspondence information into a memory device; and (f) acquiring the action set for the phenomenon corresponding to the each element and the action set for another phenomenon caused by the phenomenon, from the element/phenomenon correspondence information, and adding the actions to the each element as an error handling, and in the message sequence generation method of the present invention, the steps are executed through data processing by a computer.

The present invention is also intended for a message sequence generation device for generating a message sequence on the basis of message sequence information indicating a normal procedure of a communication protocol by using a message sequence diagram and a phenomenon causal relationship model describing a plurality of phenomena including a phenomenon which requires an error handling together with a causal relationship thereof. According to the present invention, the message sequence generation device includes a setting means for setting an action for a specific phenomenon in the phenomenon causal relationship model, the action being performed when the specific phenomenon occurs; a generation means for associating each element in the message sequence information with each of the phenomena to generate element/phenomenon correspondence information; a storing means for storing the element/phenomenon correspondence information; and an adding means (37) for adding the action set for the phenomenon corresponding to the each element and the action set for another phenomenon caused by the phenomenon to the each element as an error handling from the element/phenomenon correspondence information.

Effects of the Invention

Since the message sequence generation method according to the present invention includes the steps of (a) preparing message sequence information indicating a normal procedure of a communication protocol by using a message sequence diagram, for data processing; (b) preparing a phenomenon causal relationship model describing a plurality of phenomena including a phenomenon which requires an error handling together with a causal relationship thereof, for data processing; (c) setting an action for a specific phenomenon in the phenomenon causal relationship model, the action being performed when the specific phenomenon occurs; (d) associating each element in the message sequence information with each of the phenomena to generate element/phenomenon correspondence information; (e) storing the element/phenomenon correspondence information into a memory device; and (f) acquiring the action set for the phenomenon corresponding to the each element and the action set for another phenomenon caused by the phenomenon, from the element/phenomenon correspondence information, and adding the actions to the each element as an error handling and the steps are executed through data processing by a computer, an error handling can be added in consideration of the causal relationship among the phenomena from the phenomenon causal relationship model, and it is therefore possible to efficiently generate a message sequence diagram with an error handling added thereto.

Further, since the message sequence generation device is a device for generating a message sequence on the basis of message sequence information indicating a normal procedure of a communication protocol by using a message sequence diagram and a phenomenon causal relationship model describing a plurality of phenomena including a phenomenon which requires an error handling together with a causal relationship thereof and includes a setting means (35) for setting an action for a specific phenomenon in the phenomenon causal relationship model, the action being performed when the specific phenomenon occurs; a generation means for associating each element in the message sequence information with each of the phenomena to generate element/phenomenon correspondence information; a storing means for storing the element/phenomenon correspondence information; and an adding means for adding the action set for the phenomenon corresponding to the each element and the action set for another phenomenon caused by the phenomenon to the each element as an error handling from the element/phenomenon correspondence information, an error handling can be added in consideration of the causal relationship among the phenomena from the phenomenon causal relationship model, and it is therefore possible to efficiently generate a message sequence diagram with an error handling added thereto.

These and other objects, features, aspects and advantages of the present invention will become more apparent from the following detailed description of the present invention when taken in conjunction with the accompanying drawings.

BRIEF DESCRIPTION OF DRAWINGS

FIG. 6 is a flowchart showing an operation of the element/phenomenon correspondence information generation means 35;

FIG. 19 is a view showing an example of information on an error handling;

FIG. 30 is a view showing an example of element definition information;

FIG. 31 is a view showing an example of phenomenon definition information;

FIG. 32 is a view showing an example of element/phenomenon correspondence definition information; and FIG. 33 is a view showing an example of action/phenomenon correspondence definition information.

BEST MODE FOR CARRYING OUT THE INVENTION

A. The First Preferred Embodiment

<A-1. Constitution>

Figure 1:
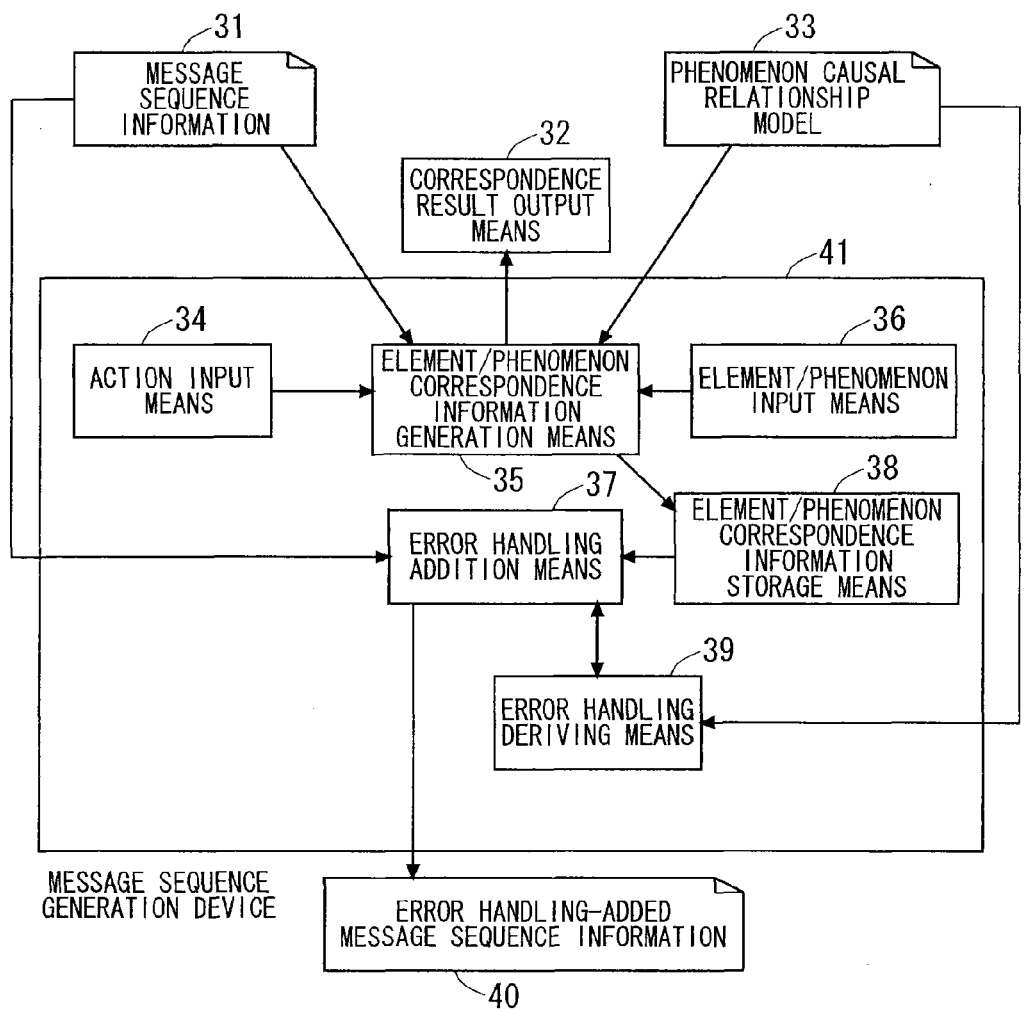
FIG. 1 is a block diagram showing a constitution of a message sequence generation device 41 in accordance with a first preferred embodiment of the present invention.

FIG. 1 is a block diagram showing a constitution of a message sequence generation device 41 in accordance with the first preferred embodiment of the present invention.

As shown in FIG. 1, the message sequence generation device 41 comprises an element/phenomenon correspondence information generation means 35 for acquiring each element described in message sequence information 31 and each phenomenon described in a phenomenon causal relationship model 33.

Herein, the message sequence information 31 indicates specifications of a communication protocol by using a message sequence diagram. The phenomenon causal relationship model 33 describes a plurality of phenomena including a phenomenon which requires an error handling together with a causal relationship thereof.

To the element/phenomenon correspondence information generation means 35, an action is inputted from an action input means 34 and an event is inputted from an element/phenomenon input means 36.

The message sequence generation device 41 further comprises an element/phenomenon correspondence information storage means 38 to which element/phenomenon correspondence information is inputted from the element/phenomenon correspondence information generation means 35, an error handling deriving means 39 for deriving an error handling caused by a phenomenon in the phenomenon causal relationship model 33, and an error handling addition means 37 for adding the element/phenomenon correspondence information and the error handling to the message sequence information 31. The message sequence information 31 to which the error handling is added becomes error handling-added message sequence information 40.

The message sequence generation device 41 further comprises a correspondence result output means 32 for outputting the element/phenomenon correspondence information.

Herein, an element in the message sequence information 31 indicates an operation, a status, a result thereof, or a process thereof which are included in the message sequence information, and is, for example, transmission and reception of a message, an internal action, or the like.

An action inputted from the action input means 34 refers to a predetermined processing which is performed when each phenomenon in the phenomenon causal relationship model 33 occurs.

Figure 2:
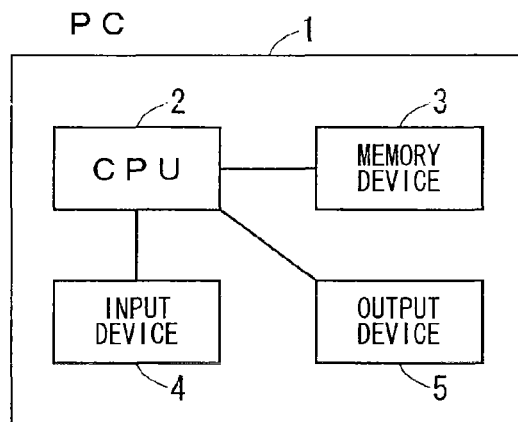
FIG. 2 is a view showing a hardware constitution in accordance with the first preferred embodiment of the present invention.

FIG. 2 shows a hardware constitution in a case where the message sequence generation device 41 is actually operated. FIG. 2 shows a PC 1 serving as the message sequence generation device 41 shown in FIG. 1. The message sequence generation device 41 may include not only a PC but also, for example, a general computer.

The PC 1 includes a CPU 2 for performing computation, a memory device 3 in which information is stored, an input device 4 for giving an input to the PC, such as a mouse, a keyboard, or the like, and an output device 5 for giving an output, such as a display or the like.

The element/phenomenon correspondence information generation means 35, the element/phenomenon correspondence information storage means 38, the error handling deriving means 39, and the error handling addition means 37 are stored in the memory device 3 as programs and executed by the CPU 2.

Further, the action input means 34 and the element/phenomenon input means 36 are supplied with an input from a user by the input device 4. The correspondence result output means 32 outputs the element/phenomenon correspondence information through the output device 5. Further, the error handling-added message sequence information 40 is outputted by the output device 5.

Figure 3:
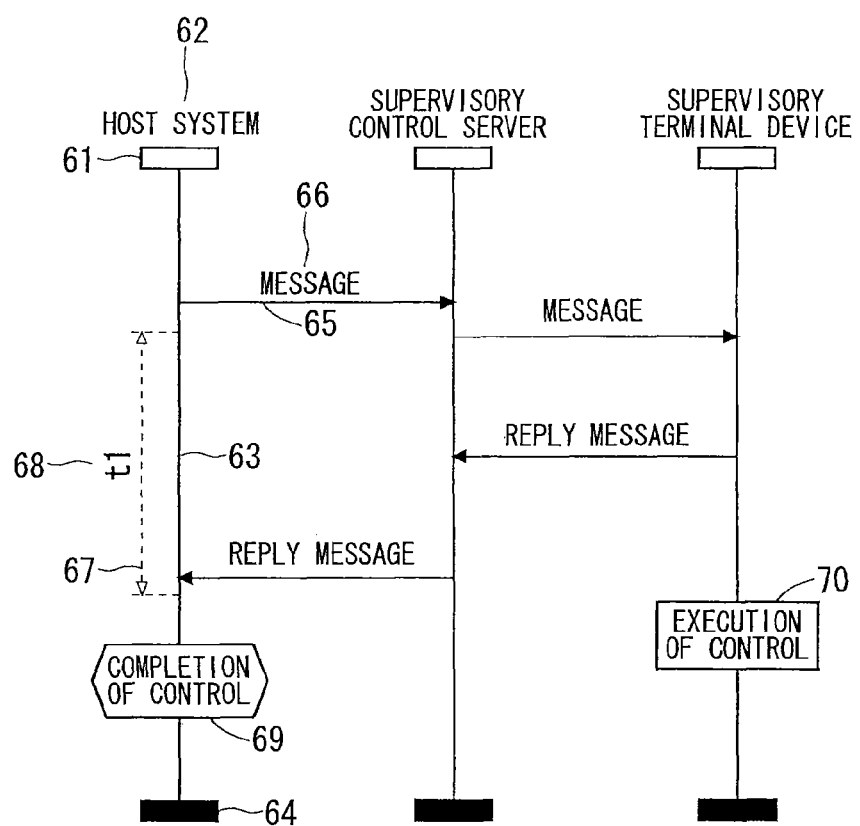
FIG. 3 is a view showing an example of message sequence information 31.

FIG. 3 is a view showing an example of the message sequence information 31 shown in FIG. 1. In the message sequence information 31, the time base is vertically represented and time flows from upper to lower.

In the message sequence information, a system which mainly performs the transmission and reception of a message, a device, or a function in the system is referred to an instance. The instance consists of a start-of-instance symbol 61, an instance name 62, a lifeline 63, and an end-of-instance symbol 64.

The name of the instance is represented by the instance name 62. The start position and the end position of the instance are represented by the start-of-instance symbol 61 and the end-of-instance symbol 64, respectively.

The start-of-instance symbol 61 and the end-of-instance symbol 64 are connected with the lifeline 63, which indicates a lifetime of the instance. An exchange of a message between the instances is represented by a message symbol 65. For the message, a direction is defined, and a sender and a destination (send target) of the message are thereby distinguished. The kind of message or the name of the message is represented by a message name 66.

A timer is represented by a timer symbol 67, and a name thereof and a time period are indicated by timer information 68. A status of the instance is represented by a status symbol 69, and an internal action of an instance which is not accompanied by any transmission and reception of a message is represented by an internal action symbol 70.

As to a positional relation, the instance name 62, the message name 66, and the timer information 68 may be placed at any positions only if the relation among the start-of-instance symbol 61, the message symbol 65, and the timer symbol can be recognized. Further, the end-of-instance symbol 64 may be omitted.

The message sequence information 31 of the present invention is not limited to the one shown in FIG. 3 but may be represented by using a message sequence diagram defined by the UML (Unified Modeling Language), the Message Sequence Chart (MSC) according to ITU-T (International Telecommunication Union Telecommunication Standardization Sector) Recommendation Z.120, or the like.

Figure 4:
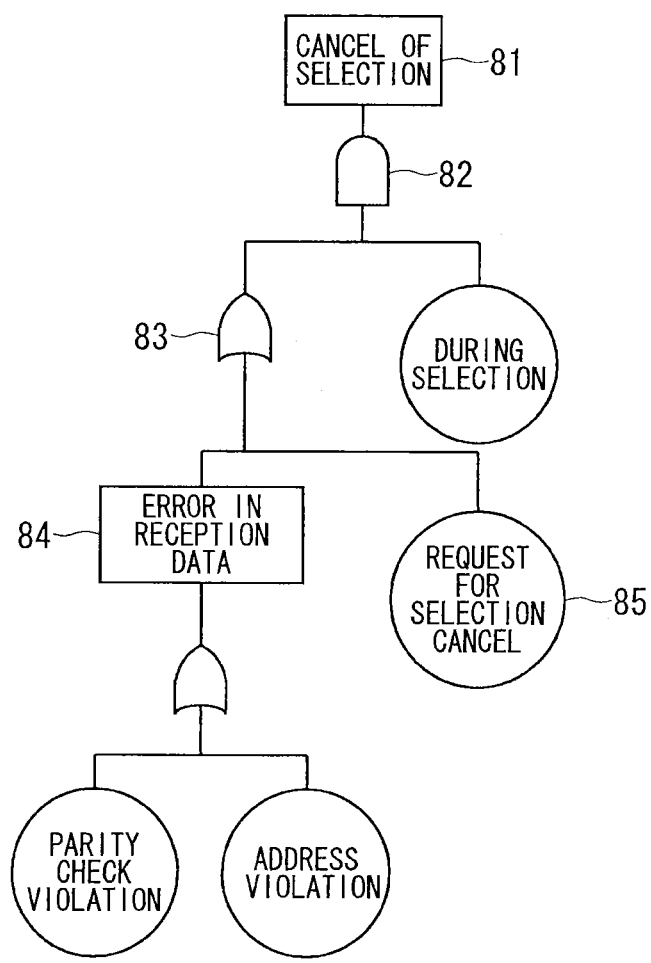
FIG. 4 is a view showing an example of a phenomenon causal relationship model 33.

FIG. 4 is a view illustrating the phenomenon causal relationship model 33 shown in FIG. 1 by taking a fault tree diagram as an example.

In the phenomenon causal relationship model 33, a causal relationship among a top phenomenon 81 indicating an abnormal phenomenon such as an error handling or the like and phenomena causing the top phenomenon 81 is represented by using logical symbols, for example, in a tree structure. The method of representing the causal relationship among phenomena is not limited to a method using logical symbols.

The top phenomenon 81 is placed on the top level in the diagram. Factors related to the occurrence of the top phenomenon 81 are arranged in the tree structure by using logical ANDs (logical products) 82 and logical ORs (logical sums) 83. The phenomena connected with the logical symbols are referred to as intermediate phenomena 84 and a phenomenon which cannot be broken down any further is referred to as a basic phenomenon 85.

<A-2. Operation>

Figure 5:
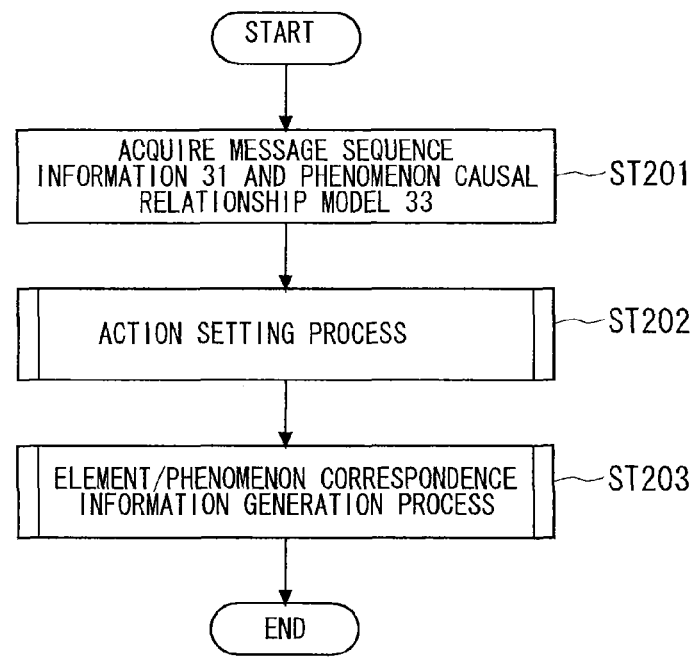
FIG. 5 is a flowchart showing an operation of an element/phenomenon correspondence information generation means 35.

FIG. 5 is a flowchart showing an operation of the element/phenomenon correspondence information generation means 35 shown in FIG. 1. The element/phenomenon correspondence information generation means 35 acquires the message sequence information 31 and the phenomenon causal relationship model 33 in Step ST201.

Next in Step ST202, performed is an action setting process in which an action (processing) is set for a phenomenon in the phenomenon causal relationship model 33, and the action is to be performed when the phenomenon occurs.

Next in Step ST203, performed is an element/phenomenon correspondence information generation process in which an element in the message sequence information 31 is associated with a phenomenon in the phenomenon causal relationship model 33. After this process is completed, the operation is ended.

<A-2-1. Setting of Action>

FIG. 6 is a flowchart showing the operation of Step ST202 in FIG. 5 (the process for setting an action for each phenomenon) performed by the element/phenomenon correspondence information generation means 35.

In Step ST210, the element/phenomenon correspondence information generation means 35 sequentially receives the events from the element/phenomenon input means 36. Herein, the event specifies a phenomenon in the phenomenon causal relationship model 33 and an element in the message sequence information 31, or terminates the specification.

In the event, the user can arbitrarily associate a phenomenon with an element. A "phenomenon" such as a breakdown of hardware or the like, which can occur in any "element" in a message sequence diagram regardless of the communication protocol, however, may be automatically associated with all the "elements" in the message sequence diagram by using "element definition information", "phenomenon definition information", and "element/phenomenon correspondence definition information".

A "phenomenon" such as parity check violation, which can occur when any message is received, may be automatically associated with all the "elements" indicating reception of a message by using the "element definition information", the "phenomenon definition information", and the "element/phenomenon correspondence definition information".

Further, an "element" indicating reception of a message included in a specific group and an "internal action" included in a specific group may be automatically associated with a "phenomenon". An "element" and a "phenomenon" may be associated with each other by using a history record.

Herein, the "element definition information" refers to information indicating a group in which each element is included. For example, an element of "reception of selected message" is included in a group of "message" and a group of "selection control message" (see FIG. 30).

The "phenomenon definition information" refers to information indicating a group in which each phenomenon is included. For example, a phenomenon of "abnormal conditions in both LAN systems" is included in a group of "failure" and a group of "communication breakdown", and a phenomenon of "parity check violation" is included in a group of "wrong message" (see FIG. 31).

The "element/phenomenon correspondence definition information" can specify a "phenomenon" and a plurality of elements corresponding thereto.

For example, since a phenomenon of "abnormal conditions in both LAN systems" can occur at any point in time regardless of the communication protocol, the phenomenon is associated with all the elements in the message sequence information. Therefore, as a corresponding element in the "phenomenon definition information", "all (elements)" is specified. This means that the phenomenon of "abnormal conditions in both LAN systems" can be associated with all the elements. As the corresponding element, a specific element name or a group in the element definition information is specified.

For example, since the phenomenon of "parity check violation" can occur when any message is received, as the corresponding element, all the elements of "reception of message" are specified. Herein, the logical expression is S1∩S2 or the like, which connects the corresponding elements with a logical symbol, and thus a detailed designation can be made.

The element/phenomenon correspondence information generation means 35 acquires a phenomenon and corresponding elements (1 to n) from the phenomenon definition information. Subsequently, the element/phenomenon correspondence information generation means 35 acquires elements corresponding to the corresponding elements 1 to n from the element definition information. An element which coincides with one which is evaluated by using the logical expression, out of all the acquired elements, is retrieved from the message sequence information, and the retrieved element is associated with the phenomenon.

Then in Step ST211, judgment of event is performed, and when the event is an end event, the operation is ended and when the event is not the end event, the process goes to Step ST212.

In Step ST212, the phenomenon in the phenomenon causal relationship model 33, which is specified by the event received in Step ST210, is stored, and the process goes to Step ST213.

In Step S213, the action which is inputted by the action input means 34 and is to be set for the phenomenon stored in Step ST212 is stored, and the process goes to Step ST214.

In Step ST214, the action stored in Step ST213 is set for the phenomenon stored in Step ST212, and the process goes to Step ST210. The events are sequentially received and an action is set for the phenomenon specified by each event. When setting of the action is completed for all the events (in other words, when the event is the end event), the operation is ended.

The user can arbitrarily associate a phenomenon with an action.

Herein, in order to efficiently associate one "action" with a plurality of phenomena, the above-discussed "phenomenon definition information" and "action/phenomenon correspondence definition information" may be used.

Herein, the "action/phenomenon correspondence definition information" refers to information indicating which "phenomenon" can be associated with each "action". As shown in FIG. 33, for each "phenomenon", the information describes a group including a "phenomenon" associated therewith. Like in the "element/phenomenon correspondence definition information", the logical expression can be also used.

The element/phenomenon correspondence information generation means 35 acquires information on each "phenomenon" from the "phenomenon definition information" and acquires information on correspondence between an action and a phenomenon from the "action/phenomenon correspondence definition information".

Subsequently, a "phenomenon" corresponding to each "action" is retrieved from the phenomenon causal relationship model 33, and the "phenomenon" is automatically associated with the action. When a plurality of actions are set for one phenomenon, an action which is set by the user may have precedence. Further, when a plurality of actions are automatically set, the user may be notified of this. An action which is set first (or last) may have precedence.

<A-2-2. Generation of Element/Phenomenon Correspondence Information>

Figure 7:
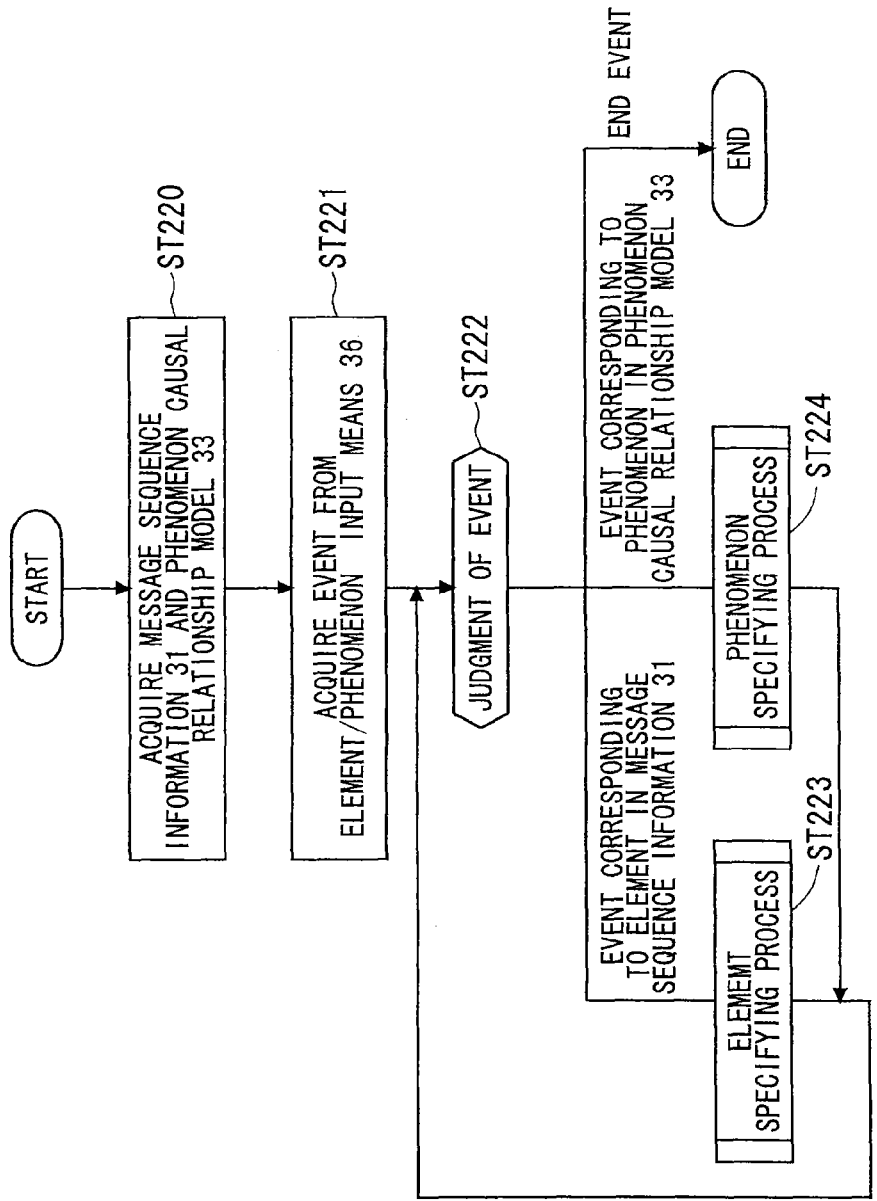
FIG. 7 is a flowchart showing an operation of the element/phenomenon correspondence information generation means 35.

FIG. 7 is a flowchart showing the operation of Step ST203 (the element/phenomenon correspondence information generation process) performed by the element/phenomenon correspondence information generation means 35.

In Step ST220, the element/phenomenon correspondence information generation means 35 acquires the message sequence information 31 and the phenomenon causal relationship model 33, and the process goes to Step ST221.

In Step ST221, the element/phenomenon correspondence information generation means 35 sequentially acquires events from the element/phenomenon input means 36, and the process goes to Step ST222. The event acquired in this step is acquired independently of the event received in Step ST210.

In Step ST222, judgment of event is performed, and when the event is an event corresponding to the element in the message sequence information 31, the process goes to Step ST223. When the event is an event corresponding to the phenomenon in the phenomenon causal relationship model 33, the process goes to Step ST224. When the event is an end event, the operation is ended.

In Step ST223, an element specifying process is performed. In Step ST224, a phenomenon specifying process is performed. Detailed discussion will be made later.

Figure 8:
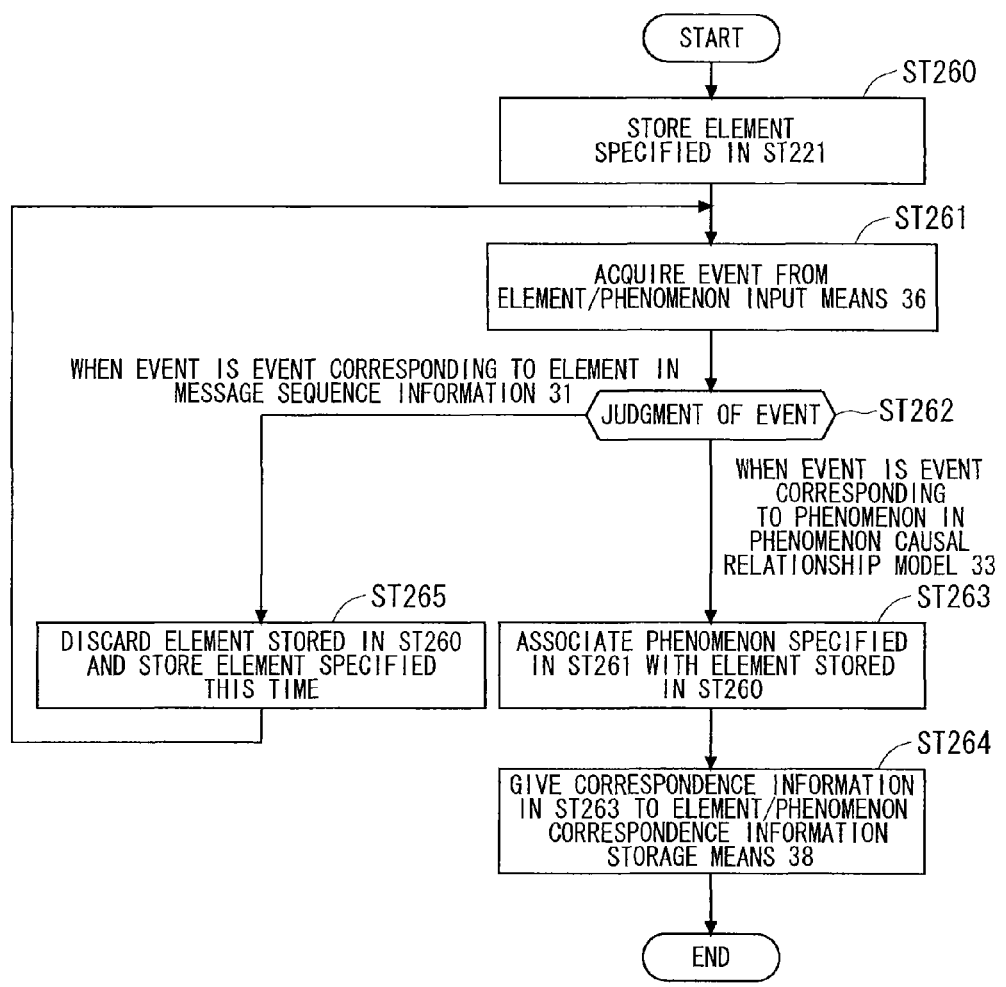
FIG. 8 is a flowchart showing an operation of the element/phenomenon correspondence information generation means 35.

FIG. 8 is a flowchart showing the operation of Step ST223 in FIG. 7 (the element specifying process) performed by the element/phenomenon correspondence information generation means 35.

In Step ST260, the element/phenomenon correspondence information generation means 35 stores the element specified by the event in Step ST221, and the process goes to Step ST261.

In Step ST261, an event is acquired from the element/phenomenon input means 36, and the process goes to Step ST262. The event acquired in this step is the same as the event acquired in Step ST221.

In Step ST262, judgment of event is performed, and when the event is an event corresponding to the element in the message sequence information 31, the process goes to Step ST265. When the event is an event corresponding to the phenomenon in the phenomenon causal relationship model 33, the process goes to Step ST263.

In Step ST263, the phenomenon specified by the event acquired in Step ST261 is associated with the element stored in Step ST260, and the process goes to Step ST264.

In Step ST264, the element/phenomenon correspondence information indicating the correspondence made in Step ST263 is stored in the element/phenomenon correspondence information storage means 38 (the memory device 3), and the operation is ended.

In Step ST265, the element stored in Step ST260 is discarded and the element specified in Step ST261 is stored, and the process goes to Step ST261 again.

Figure 9:
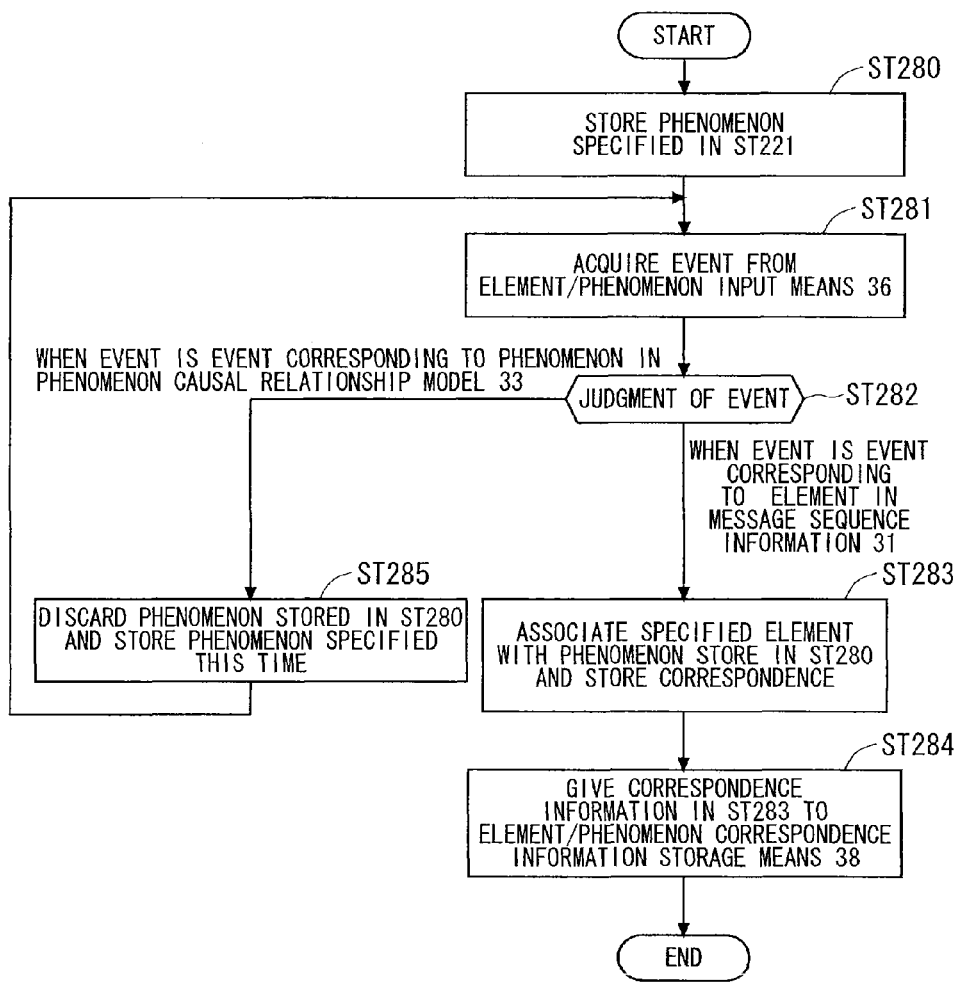
FIG. 9 is a flowchart showing an operation of the element/phenomenon correspondence information generation means 35.

FIG. 9 is a flowchart showing the operation of Step ST224 in FIG. 7 (the phenomenon specifying process) performed by the element/phenomenon correspondence information generation means 35.

In Step ST280, the element/phenomenon correspondence information generation means 35 stores the phenomenon specified by the event in Step ST221, and the process goes to Step ST281.

In Step ST281, an event is acquired from the element/phenomenon input means 36, and the process goes to Step ST282. The event acquired in this step is the same as the event acquired in Step ST221.

In Step ST282, judgment of event is performed, and when the event is an event corresponding to the phenomenon in the phenomenon causal relationship model 33, the process goes to Step ST285. When the event is an event corresponding to the element in the message sequence information 31, the process goes to Step ST283.

In Step ST283, the element specified by the event acquired in Step ST281 is associated with the phenomenon stored in Step ST280 and these are stored, and the process goes to Step ST284.

In Step ST284, the element/phenomenon correspondence information indicating the correspondence made in Step ST283 is stored in the element/phenomenon correspondence information storage means 38 (the memory device 3), and the operation is ended.

In Step ST285, the phenomenon stored in Step ST280 is discarded and the phenomenon specified in Step ST281 is stored, and the process goes to Step ST281 again.

<A-2-3. Addition of Error Handling>

Figure 10:
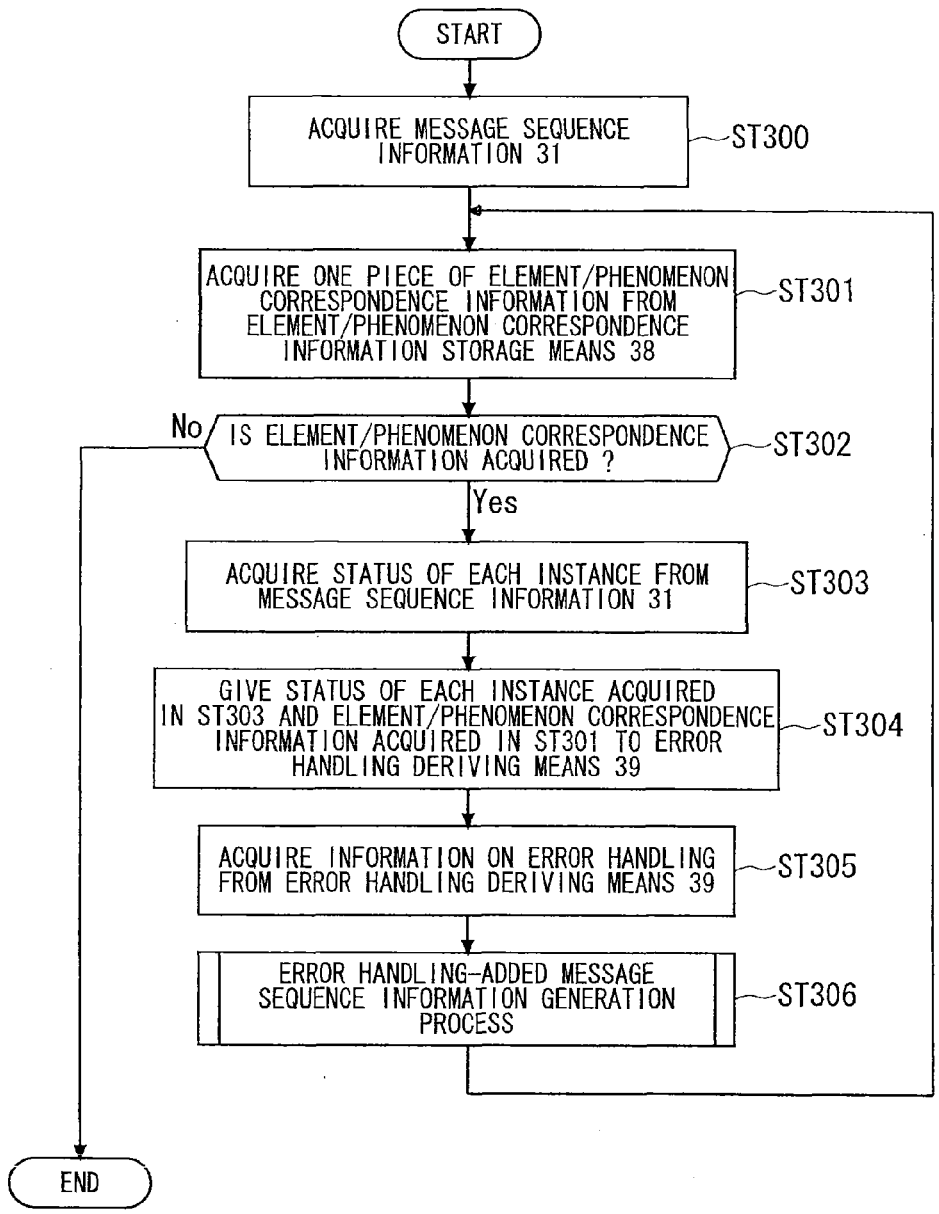
FIG. 10 is a flowchart showing an operation of an error handling addition means 37.

FIG. 10 is a flowchart showing an operation of the error handling addition means 37 shown in FIG. 1.

In Step ST300, the error handling addition means 37 acquires the message sequence information 31, and the process goes to Step ST301.

Next in Step ST301, one piece of element/phenomenon correspondence information, i.e., information on a phenomenon corresponding to one element, is acquired from the element/phenomenon correspondence information storage means 38, and the process goes to Step ST302.

In Step ST302, judgment is made on whether the element/phenomenon correspondence information for the one element is acquired or not. When the element/phenomenon correspondence information is acquired, the process goes to Step ST303, and when the element/phenomenon correspondence information is not acquired, the operation is ended.

In Step ST303, a status of each instance related to the one element acquired in Step ST302 is acquired from the message sequence information 31 acquired in Step ST300, and the process goes to Step ST304.

In Step ST304, the status of each instance acquired in Step ST303 and the element/phenomenon correspondence information for the one element acquired in Step ST301 are given to the error handling deriving means 39.

On the other hand, in Step ST305, information on an error handling for the one element acquired in Step ST301 is acquired from the error handling deriving means 39, and the process goes to Step ST306.

In Step ST306, an error handling-added message sequence information generation process is performed, and the process goes to Step ST301. Detailed discussion will be made later.

Figure 11:
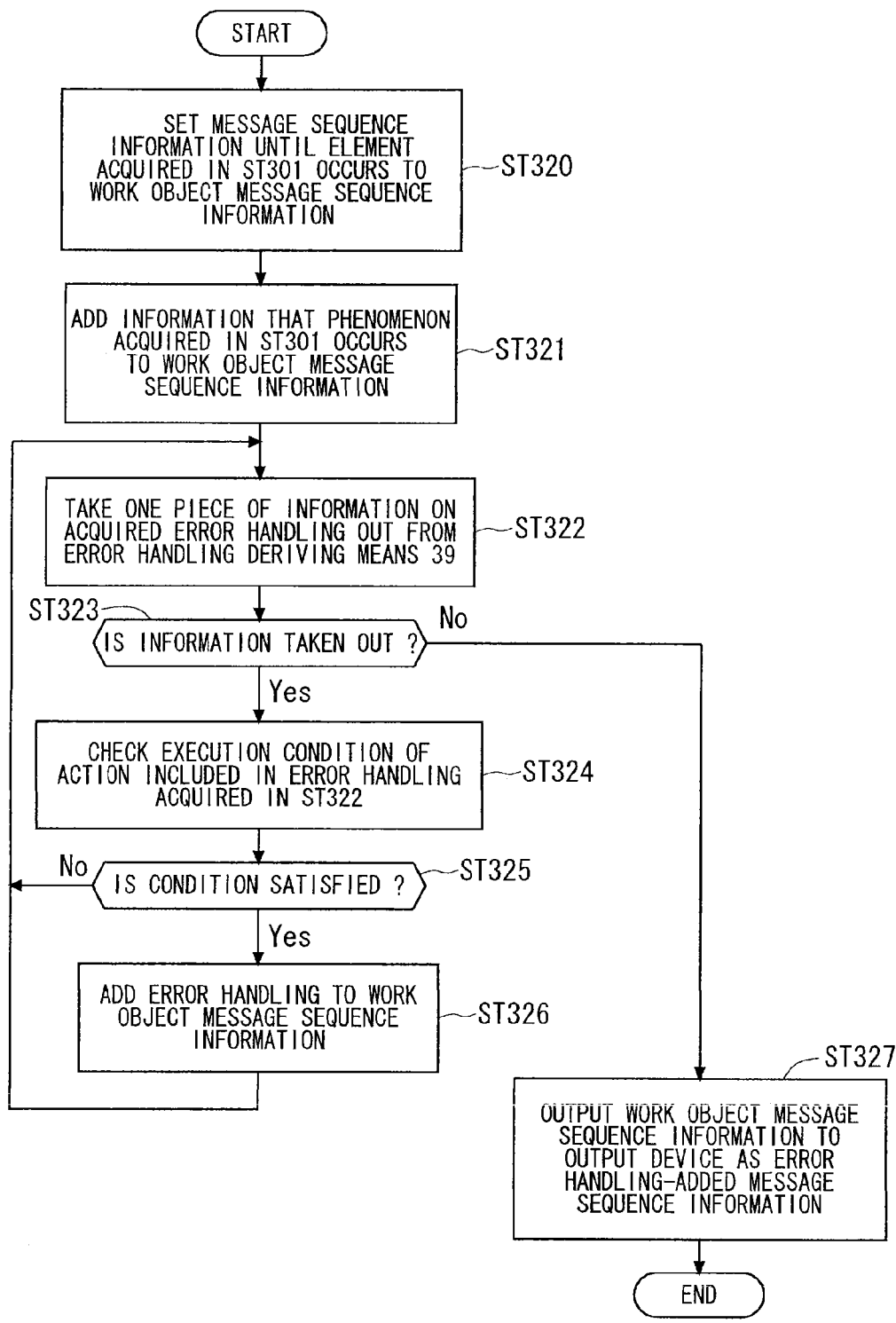
FIG. 11 is a flowchart showing an operation of the error handling addition means 37.

FIG. 11 is a flowchart showing the operation of Step ST306 in FIG. 10 (the error handling-added message sequence information generation process) performed by the error handling addition means 37.

In Step ST320, the error handling addition means 37 sets the message sequence information 31 until the one element acquired in Step ST301 occurs, as work object message sequence information, and the process goes to Step ST321.

In Step ST321, information that the phenomenon corresponding to the one element acquired in Step ST301 occurs is added to the work object message sequence information, and the process goes to Step ST322.

In Step ST322, information on an error handling caused by the phenomenon corresponding to the one element acquired in Step ST301 is taken out from the error handling deriving means 39, and the process goes to Step ST323.

In Step ST323, judgment is made on whether the information on the error handling is taken out or not. When the information is taken out, the process goes to Step ST324, and when the information is not taken out, the process goes to Step ST327.

In Step ST324, an execution condition of the action set for the phenomenon included in the information on the error handling acquired in Step ST322 is checked, and the process goes to Step ST325. The execution condition may include a condition caused by the status of the instance.

In Step ST325, judgment is made on the execution condition of the action. When the condition is satisfied, the process goes to Step ST326, and when the condition is not satisfied, the process goes to Step ST322.

In Step ST326, the acquired error handling is added to one element in the work object message sequence information, and the process goes to Step ST322.

In Step ST327, the work object message sequence information to which the corresponding error handling is added is outputted as the error handling-added message sequence information 40 to the output device 5.

<A-2-4. Derivation of Error Handling>

Figure 12:
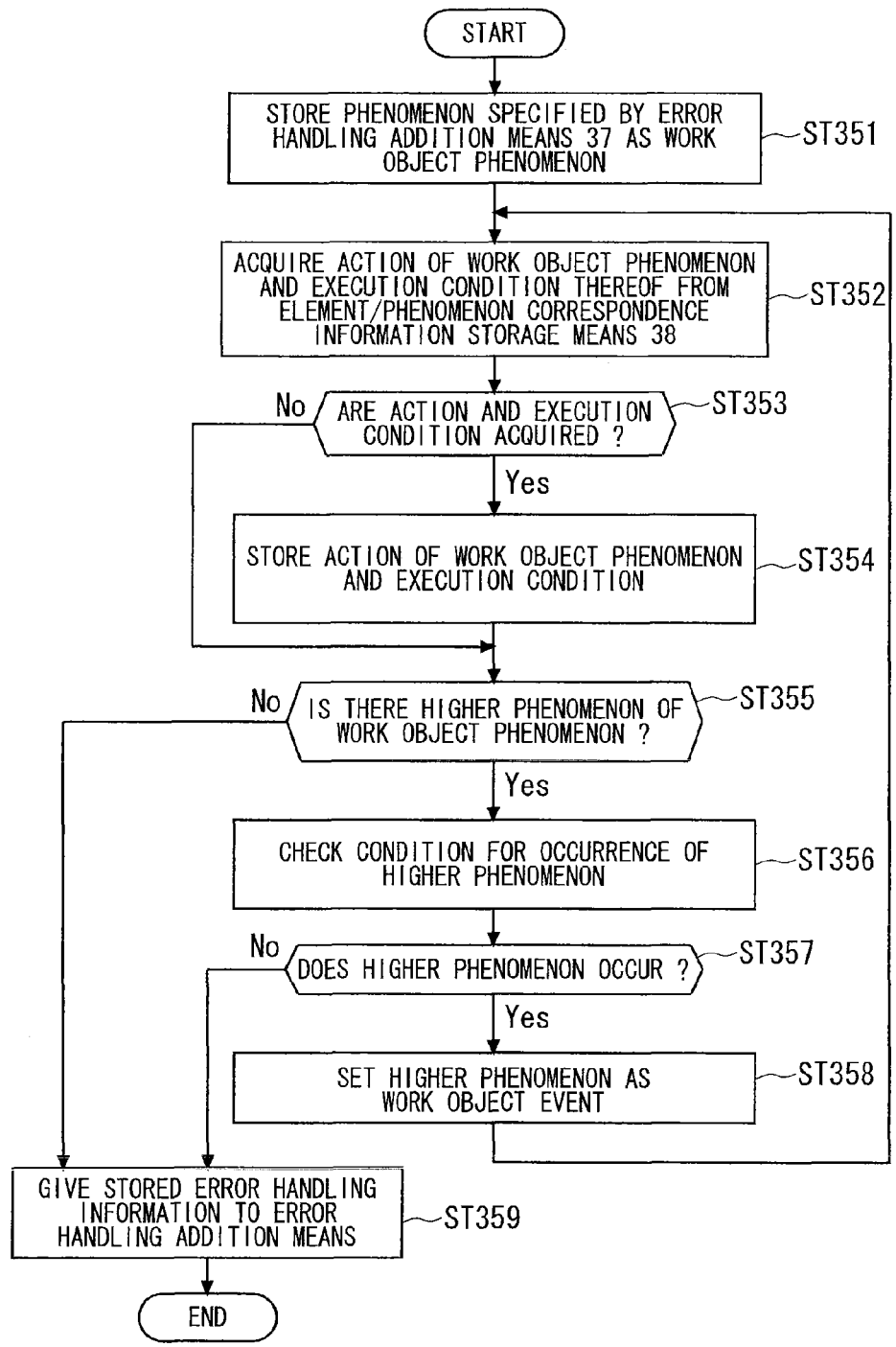
FIG. 12 is a flowchart showing an operation of an error handling deriving means 39.

FIG. 12 is a flowchart showing an operation of the error handling deriving means 39 shown in FIG. 1.

In Step ST351, the error handling deriving means 39 stores the phenomenon specified by the error handling addition means 37, i.e., the phenomenon corresponding to the one element in the work object message sequence information, as a work object phenomenon, and the process goes to Step ST352.

In Step ST352, an action for the work object phenomenon and an execution condition thereof are acquired from the element/phenomenon correspondence information storage means 38, and the process goes to Step ST353.

In Step ST353, judgment is made on whether the action and the execution condition are acquired or not. When the action and the execution condition are acquired, the process goes to Step ST354, and when these are not acquired, the process goes to Step ST355.

In Step ST354, the action for the work object phenomenon and the execution condition thereof are stored, and the process goes to Step ST355.

In Step ST355, whether there is a higher phenomenon of the work object phenomenon or not is checked. When there is a higher phenomenon of the work object phenomenon, the process goes to Step ST356, and when there is no higher phenomenon, the process goes to Step ST359.

In Step ST356, a condition for occurrence of the higher phenomenon is checked, and the process goes to Step ST357.

In Step ST357, whether the higher phenomenon occurs or not is checked. When the higher phenomenon occurs, the process goes to Step ST358, and when the higher phenomenon does not occur, the process goes to Step ST359.

In Step ST358, the higher phenomenon is set as the work object phenomenon, and the process goes to Step ST352.

In Step ST359, the action for the work object phenomenon and the execution condition thereof which are stored are given to the error handling addition means 37 as the information on the error handling.

<A-3. Exemplary Operation>

With reference to FIGS. 13 to 17, discussion will be made on exemplary operations of the first preferred embodiment.

Figure 13:
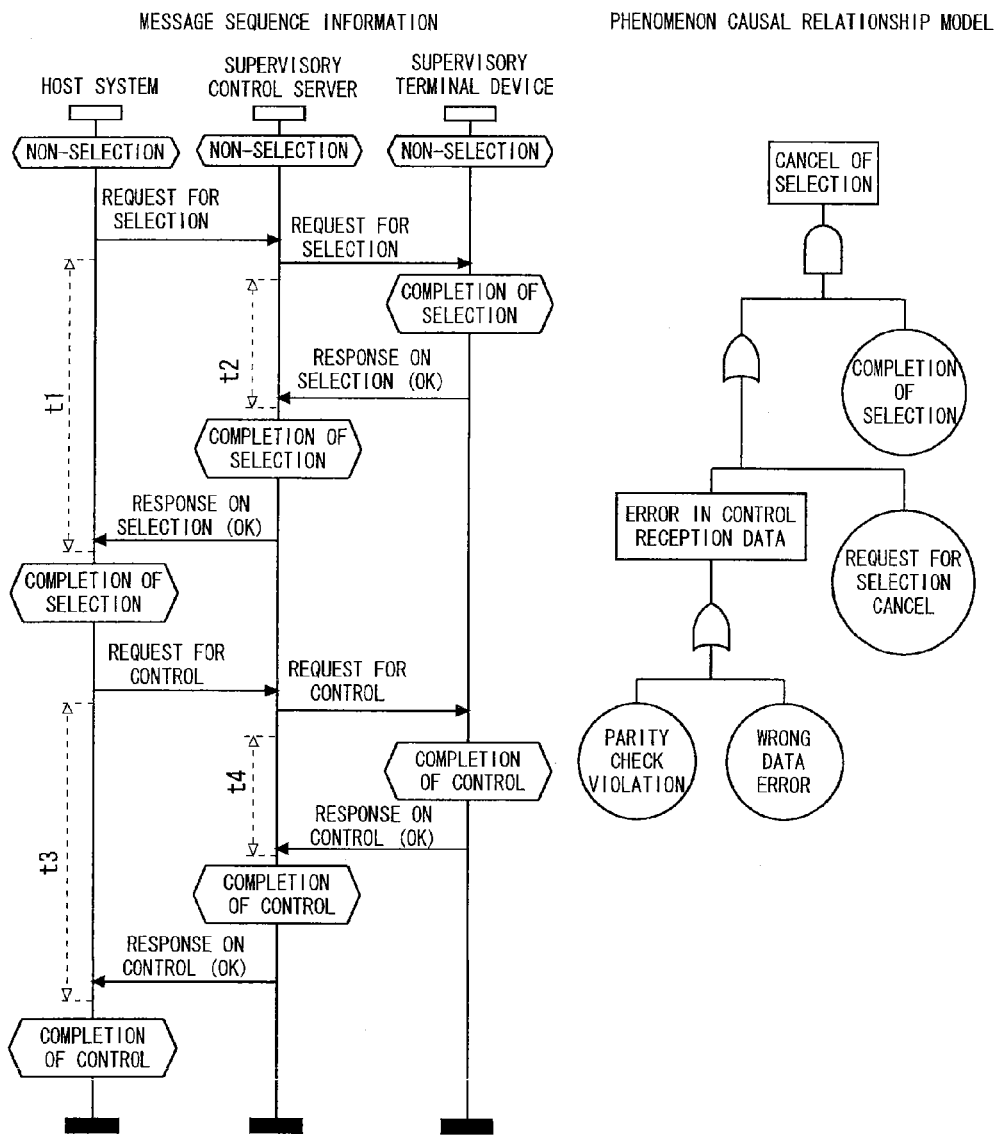
FIG. 13 is a view showing an exemplary input in accordance with the first preferred embodiment.

FIG. 13 is a view showing an exemplary input in accordance with the first preferred embodiment. In exemplary message sequence information shown in FIG. 13, there are three instances in the message sequence information, i.e., a host system, a supervisory control server, and a supervisory terminal device.

Receiving a request for selection from the host system, the supervisory control server sends the request for selection to the supervisory terminal device. The supervisory terminal device is brought into a status of "completion of selection" and sends a response on selection (OK) to the supervisory control server. The supervisory control server is brought into a status of "completion of selection" and sends a response on selection (OK) to the host system. Receiving the response on selection (OK), the host system is brought into a status of "completion of selection".

Similarly, receiving a request for control from the host system, the supervisory control server sends the request for control to the supervisory terminal device. Receiving the request for control, the supervisory terminal device is brought into a status of "completion of control" and sends a response on control (OK) to the supervisory control server. Receiving the response on control (OK), the supervisory control server is brought into a status of "completion of control" and sends a response on control (OK) to the host system. Receiving the response on control (OK), the host system is brought into a status of "completion of control".

In an exemplary phenomenon causal relationship model shown in FIG. 13, the top phenomenon representing an abnormal phenomenon such as an error handling is cancel of selection. The cancel of selection is caused by an error in control request reception data or a request for selection cancel only during selection. Further, the error in control request reception data is caused by parity check violation or a wrong data error.

Figure 14:
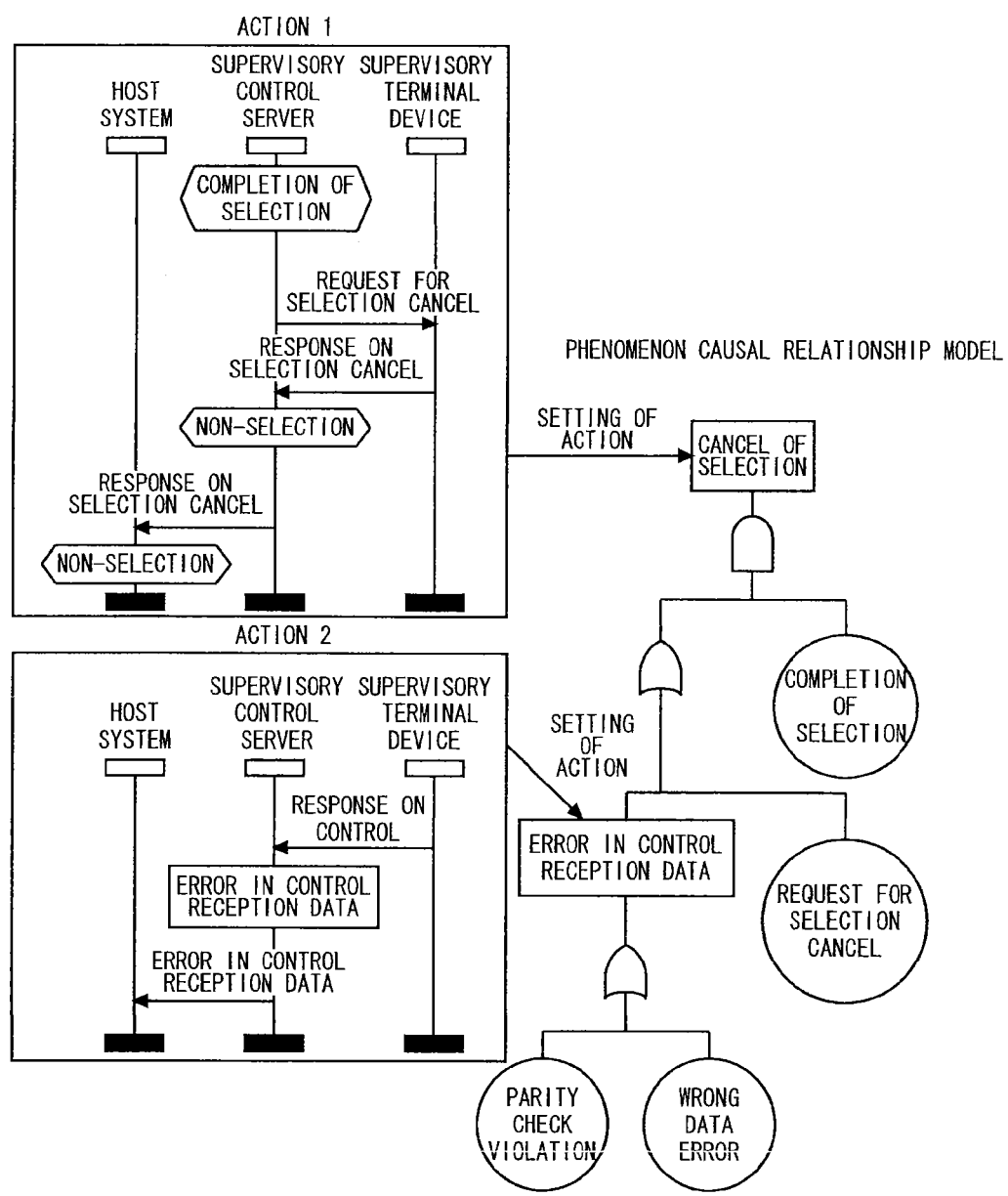
FIG. 14 is a view showing an example of an action setting process performed by the element/phenomenon correspondence information generation means 35.

FIG. 14 is a view showing an example of an action setting process (see Step ST202) performed by the element/phenomenon correspondence information generation means 35 in accordance with the first preferred embodiment of the present invention. In the events, cancel of selection and error in control reception data are specified, respectively.

An action 1 described below is set for the cancel of selection which is the top phenomenon.

In the action 1, the supervisory control server sends a request for selection cancel to the supervisory terminal device, and receives a response on selection cancel in response to the request for selection cancel, thereby being brought into a status of "non-selection". Subsequently, the supervisory control server sends the response on selection cancel to the host system, and the host system receives the response on selection cancel, thereby being brought into a status of "non-selection".

An action 2 described below is set for the error in control reception data which is the intermediate phenomenon.

In the action 2, the supervisory terminal device sends a response on control to the supervisory control server, and the supervisory control server receives the response on control, thereby being brought into a status of "error in control reception data". Subsequently, the supervisory control server sends the error in control reception data to the host system, and the host system receives the error in control reception data.

Figure 15:
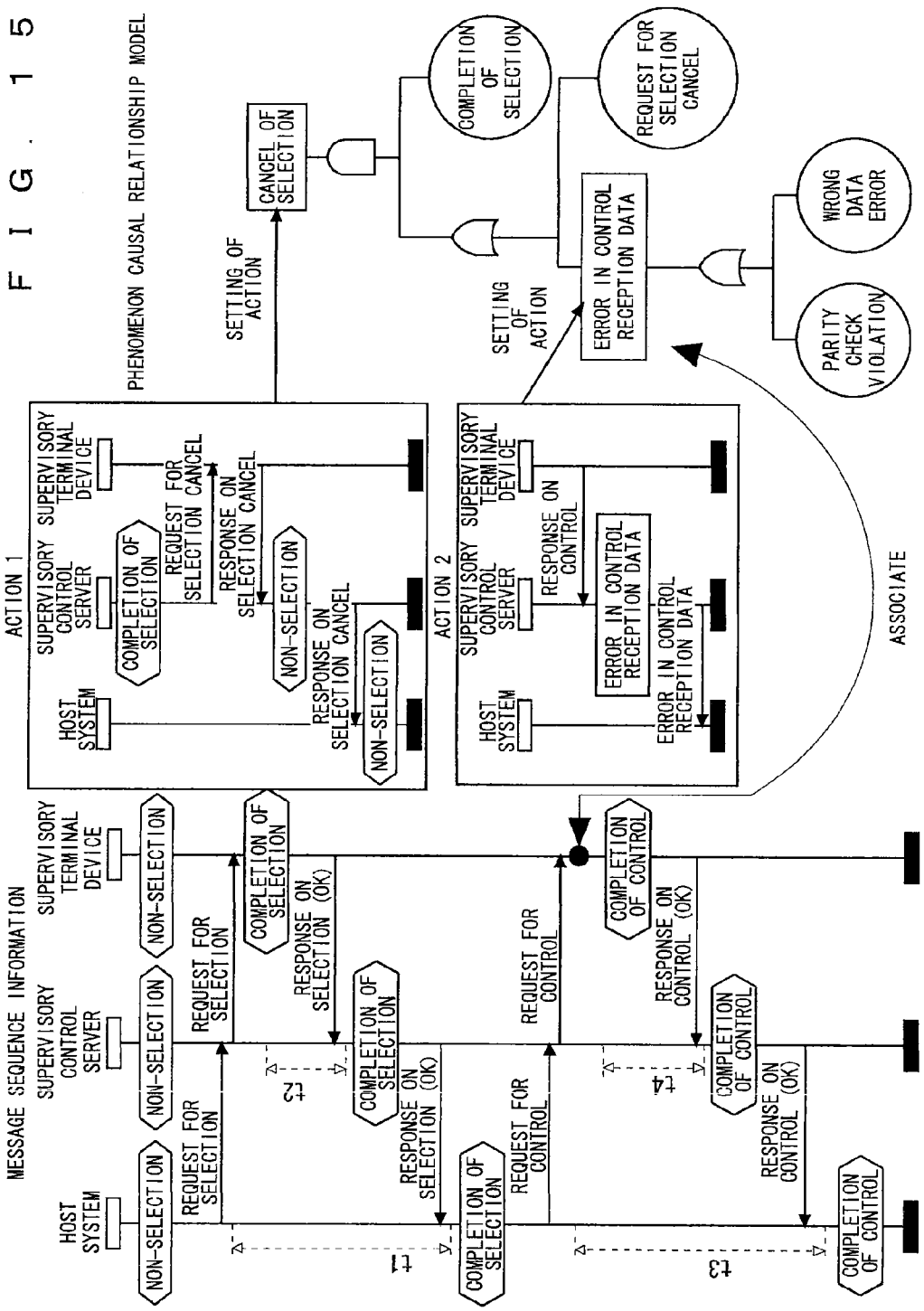
FIG. 15 is a view showing an example of associating an element with a phenomenon in the element/phenomenon correspondence information generation means 35.

FIG. 15 is a view showing an exemplary element/phenomenon correspondence information generation process performed by the element/phenomenon correspondence information generation means 35 in accordance with the first preferred embodiment of the present invention.

A point (one element) in the message sequence information 31 where the supervisory terminal device receives the request for control is associated with a phenomenon of "error in control reception data" in the phenomenon causal relationship model 33.

Figure 16:
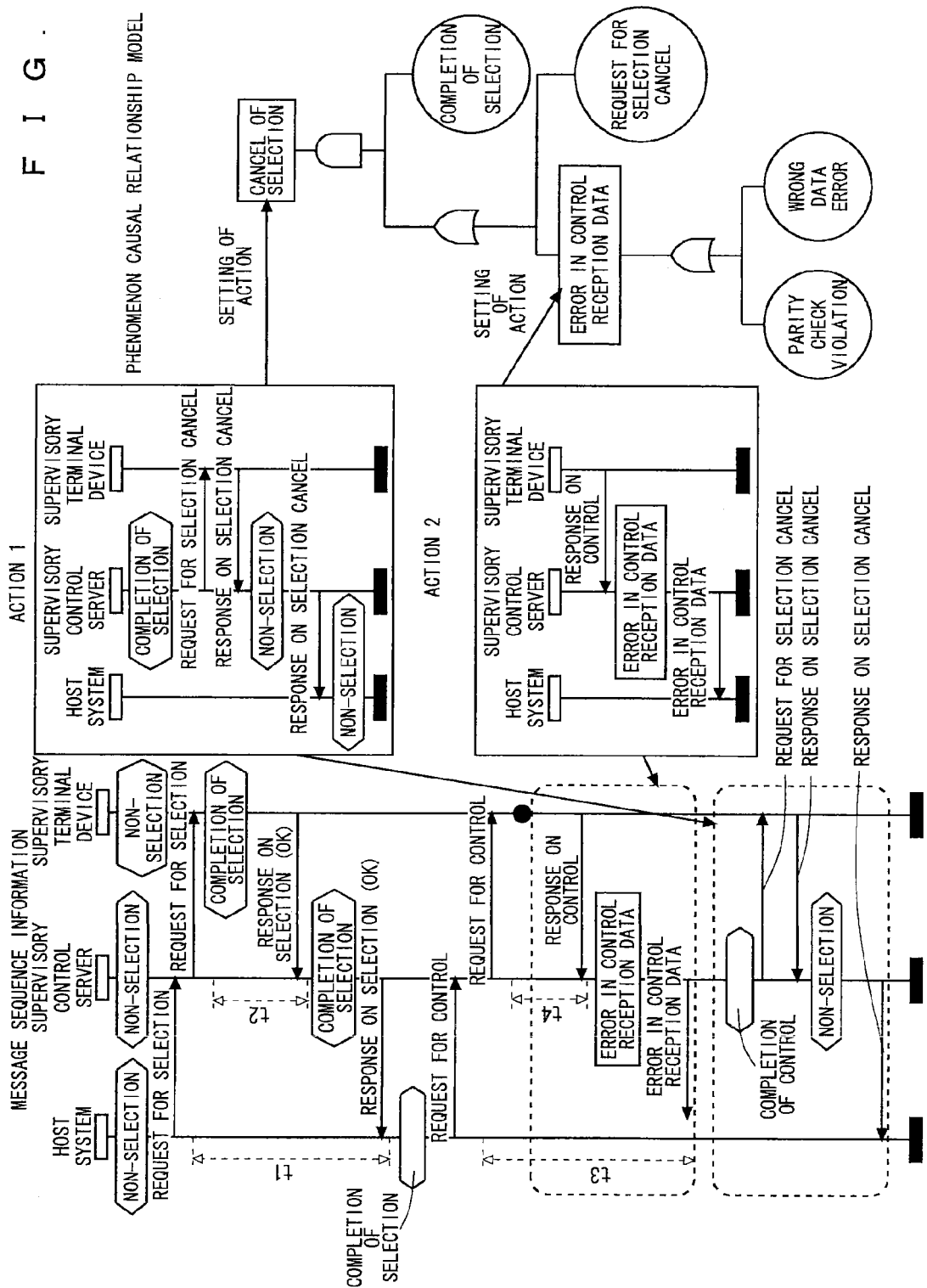
FIG. 16 is a view showing an exemplary operation of the error handling addition means 37 and the error handling deriving means 39.

FIG. 16 is a view showing an exemplary operation of the error handling addition means 37 and the error handling deriving means 39 in accordance with the first preferred embodiment of the present invention.

First, in Step ST301, the error handling addition means 37 acquires one piece of element/phenomenon correspondence information, i.e., information on a phenomenon corresponding to one element from the element/phenomenon correspondence information storage means 38. In this exemplary case, the error handling addition means 37 acquires information on correspondence between the point (one element) where the supervisory terminal device receives the request for control and the phenomenon of "error in control reception data" (see FIG. 15).

In Step ST303, the status of each instance related to the one element acquired in Step ST302 is acquired from the message sequence information 31 acquired in Step ST300. In this exemplary case, the respective statuses of the host system, the supervisory control server, and the supervisory terminal device are all "completion of selection".

In Step ST304, the status of each instance acquired in Step ST303 and the element/phenomenon correspondence information on the one element, which is acquired in Step ST301, are given to the error handling deriving means 39.

On the other hand, the error handling deriving means 39 stores the phenomenon specified by the error handling addition means 37 in Step ST351, i.e., the phenomenon corresponding to the one element in the work object message sequence information, as the work object phenomenon. In this exemplary case, since the element/phenomenon correspondence information of the point (one element) where the supervisory terminal device receives the request for control and the phenomenon of "error in control reception data" is acquired, the work object phenomenon is the phenomenon of "error in control reception data".

In Step ST352, an action for the work object phenomenon and an execution condition thereof are acquired from the element/phenomenon correspondence information storage means 38. In this exemplary case, the action 2 shown in FIG. 14 is set. The execution condition is not set.

In Step ST354, the action for the work object phenomenon and the execution condition thereof are stored, and in Step ST355, whether there is a higher phenomenon of the work object phenomenon or not is checked. In this exemplary case, since the top phenomenon of "cancel of selection" is present as the higher phenomenon, the process goes to Step ST356.

In Step ST356, a condition for occurrence of the higher phenomenon is checked. In this exemplary case, when the status is completion of selection, the phenomenon of "cancel of selection" occurs.

In Step ST357, whether the higher phenomenon occurs or not is checked. In this exemplary case, since the respective statuses of the instances acquired from the error handling addition means 37 are all "completion of selection", the condition is satisfied. Therefore, in Step ST354, the action 1 which is an action for the top phenomenon of "cancel of selection" is stored. The execution condition for the action 1 is not set.

In Step ST359, the action for the phenomenon and the execution condition which are stored are given to the error handling addition means 37 as an error handling. In this exemplary case, the action 2 set for the phenomenon and the action 1 caused by the phenomenon are stored.

Further, in Step ST321, the error handling addition means 37 adds information that a corresponding phenomenon occurs to the work object message sequence information until the one element acquired in Step ST301 occurs. In this exemplary case, the information that the phenomenon of "error in control reception data" is added to the point (one element) where the supervisory terminal device receives the request for control.

Subsequently, in Step ST322, the error handling deriving means 39 takes out the error handling which is stored. Specifically, the action set for the phenomenon and the action caused by the phenomenon are taken out in the order of storage.

In this exemplary case, the action 2 is first taken out, and the action 2 is added to the work object message sequence information in Step ST326. In this exemplary case, the action 2 is added to the message sequence information in which the phenomenon of "error in control reception data" occurs.

Figure 17:
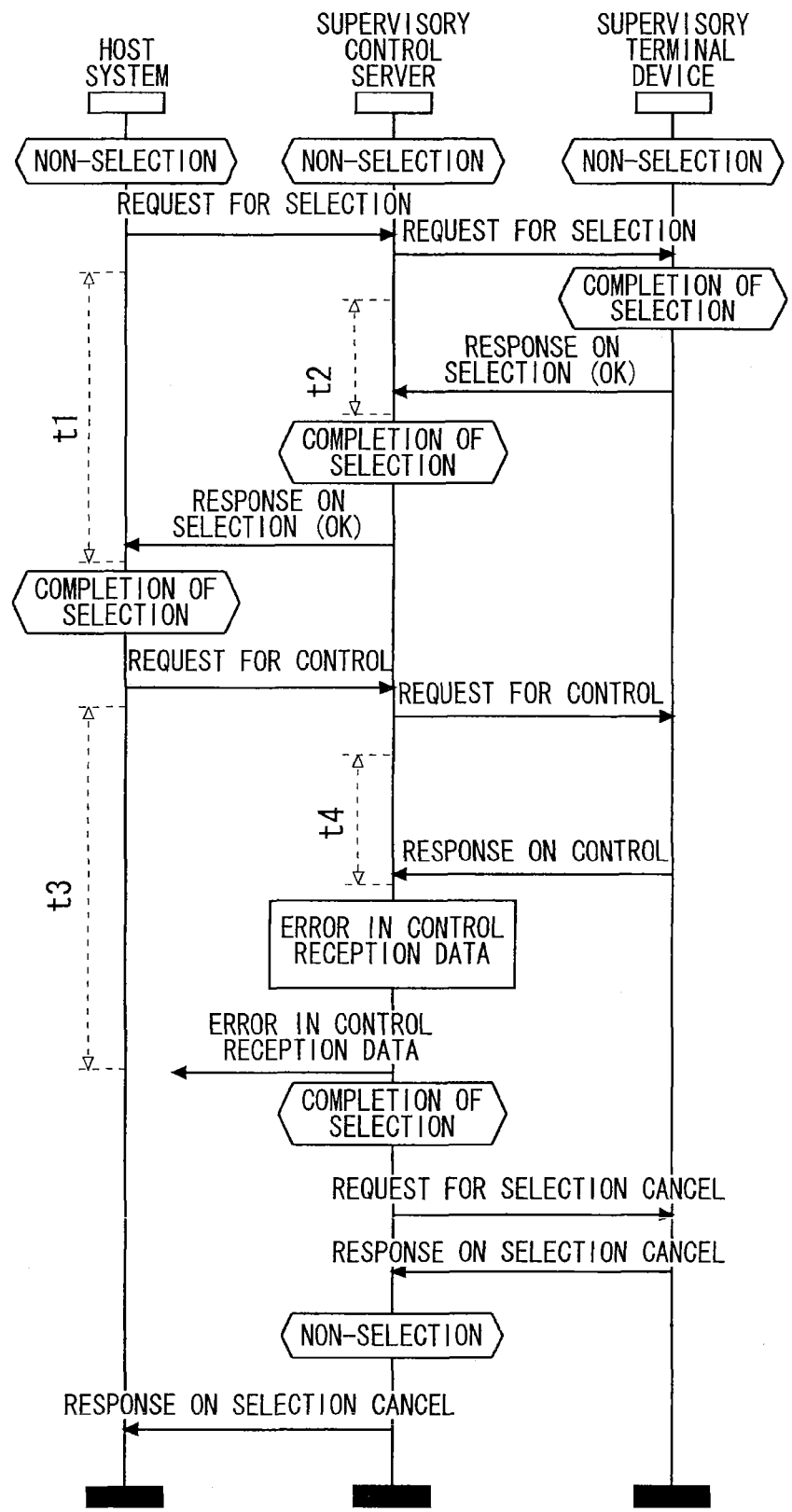
FIG. 17 is a view showing an example of error handling-added message sequence information 40.

Subsequently, the action 1 is taken out in Step ST322, and the action 1 is added in Step ST326 to the work object message sequence information to which the action 2 has been already added. Since all the error handling procedures are taken out, the work object message sequence information to which these information are added is determined as the error handling-added message sequence information, and in Step ST327, the error handling-added message sequence information shown in FIG. 17 is outputted to the output device 5.

With the above-discussed constitution, since the error handling deriving means 39 derives the information on the error handling required when the phenomenon occurs and the error handling addition means 37 generates a message sequence diagram to which the information on the error handling is added, it is possible to efficiently generate a message sequence diagram describing abnormal specifications.

<A-4. Effects>

In the first preferred embodiment of the present invention, since the message sequence generation method includes the steps of (a) preparing the message sequence information 31 for data processing, (b) preparing the phenomenon causal relationship model 33 for data processing, (c) setting an action for a specific phenomenon in the phenomenon causal relationship model 33, the action being performed when the specific phenomenon occurs, (d) associating each element in the message sequence information with each phenomenon to generate the element/phenomenon correspondence information, (e) storing the element/phenomenon correspondence information into the memory device 3, and (f) adding the action set for the phenomenon corresponding to the each element and the action set for another phenomenon caused by the phenomenon to the each element as an error handling on the basis of the element/phenomenon correspondence information stored in the memory device 3 and these steps are executed through data processing by a computer, the error handling can be added in consideration of the causal relationship among the phenomena from the phenomenon causal relationship model 33, and it is therefore possible to efficiently generate a message sequence diagram with an error handling added thereto.

In the message sequence generation method of the first preferred embodiment of the present invention, since the step (b) is a step of preparing the phenomenon causal relationship model 33 describing the causal relationship by using a logical symbol for data processing, it is possible to efficiently represent the causal relationship among the phenomena.

In the message sequence generation method of the first preferred embodiment of the present invention, since the step (f) is a step of adding the error handling on the basis of the status of each instance in the message sequence information 31, it is possible to perform the error handling by using the status of the instance as the execution condition.

In the first preferred embodiment of the present invention, since the message sequence generation device is a device for generating a message sequence on the basis of the message sequence information 31 indicating a normal procedure of a communication protocol by using a message sequence diagram and the phenomenon causal relationship model 33 describing a plurality of phenomena including a phenomenon which requires an error handling together with a causal relationship thereof and includes the element/phenomenon correspondence information generation means 35 as a setting means for setting an action for a specific phenomenon in the phenomenon causal relationship model, the action being performed when the specific phenomenon occurs, and as a generation means for associating each element in the message sequence information with each of the phenomena to generate the element/phenomenon correspondence information, the element/phenomenon correspondence information storage means 38 as a storing means for storing the element/phenomenon correspondence information, and the error handling addition means 37 as an adding means for adding the action set for the phenomenon corresponding to the each element and the action set for another phenomenon caused by the phenomenon to the each element as an error handling on the basis of the element/phenomenon correspondence information stored in the element/phenomenon correspondence information storage means 38, an error handling can be added in consideration of the causal relationship among the phenomena from the phenomenon causal relationship model 33, and it is therefore possible to efficiently generate a message sequence diagram with an error handling added thereto.

B. The Second Preferred Embodiment

<B-1. Constitution>

Figure 18:
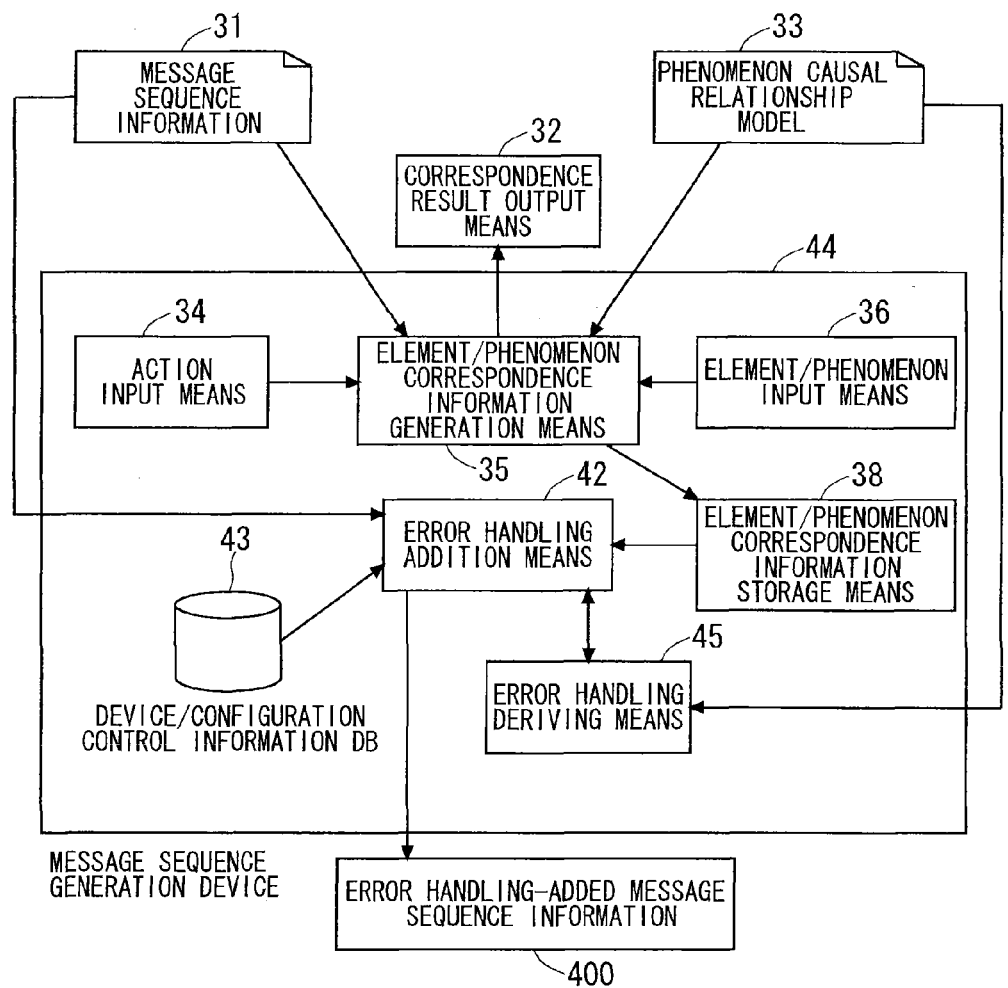
FIG. 18 is a block diagram showing a constitution of a message sequence generation device 44 in accordance with a second preferred embodiment.

FIG. 18 is a block diagram showing a constitution of a message sequence generation device 44 in accordance with the second preferred embodiment of the present invention. Constituent elements shown in this block diagram other than an error handling addition means 42, a device/configuration control information DB 43, and an error handling deriving means 45 are identical to those in the first preferred embodiment, and therefore detailed description thereof will be omitted.

In the second preferred embodiment of the present invention, when the error handling deriving means 45 derives an error handling accompanied by system switching from the phenomenon causal relationship model 33, the error handling addition means 42 acquires device/configuration control information from the device/configuration control information DB 43 and outputs error handling-added message sequence information in a case of system switching.

FIG. 19 is a view showing an example of information on an error handling. A serial number is given to the information on the error handling in the order of execution, and is associated with a name of a phenomenon corresponding to the error handling, an action set for the phenomenon, an execution condition thereof, and conditions for configuration control in a case where the phenomenon occurs.

In this exemplary case, the serial number "1" is associated with a phenomenon name of "system switching" and an action of "action 1", and in this case, the execution condition is not set and the configuration control condition is "self-mode: regular" and "other party's mode: backup".

Figures 20A, 20B, 20C:
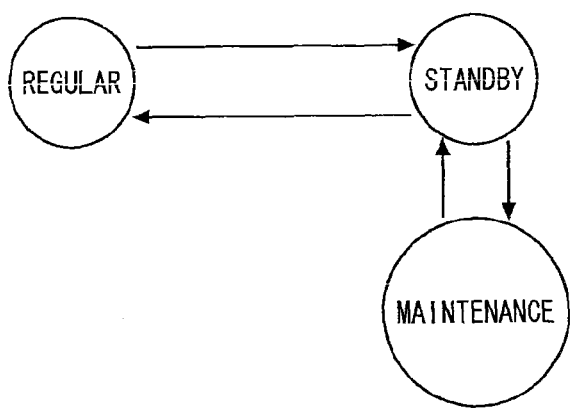
FIG. 20A to FIG. 20C are views each showing an example of a device/configuration control information DB 43.

FIGS. 20A to 20C show examples of the device/configuration control information DB 43. The device/configuration control information DB 43 includes device information, mode status combination information, and mode status transition information.

In the device information shown in FIG. 20A, stored are a device included in an object system, a name, a class, and an IP address which are specified. As the class, specified is an instance name in the message sequence information.

The mode status combination information shown in FIG. 20B specifies combinations of respective operation modes of the systems in a case where the object system has a redundant configuration. In this exemplary case, combinations in which both the server 1 and the server 2 are in a regular mode or in a standby mode and a combination of a maintenance mode and a standby mode are not allowed. A combination of the regular mode and the standby mode and a combination of the regular mode and the maintenance mode are allowed.

The mode status transition information shown in FIG. 20C is information indicating the status transition among the regular mode, the standby mode, and the maintenance mode.

<B-2. Operation>

Figure 21:
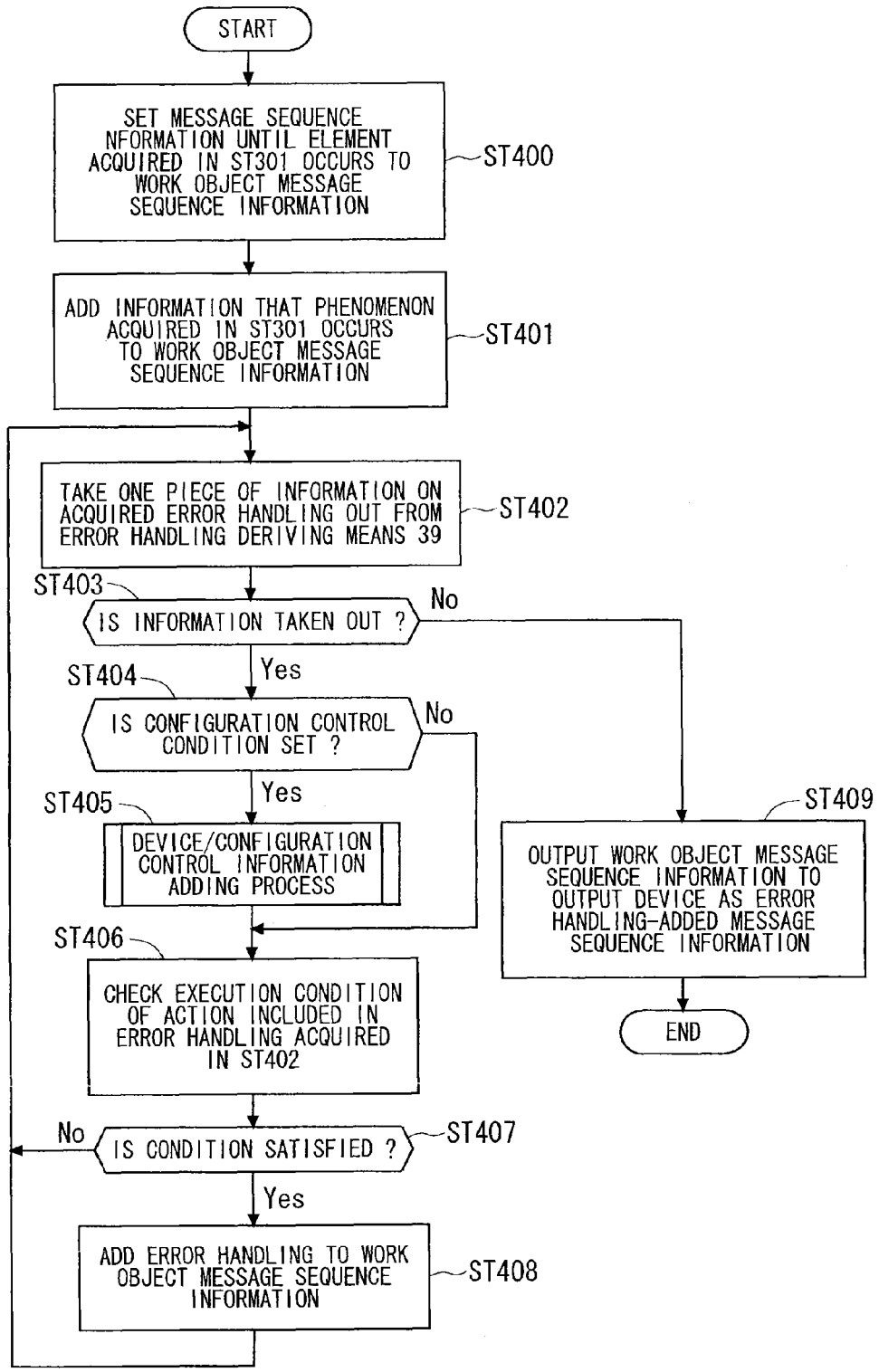
FIG. 21 is a flowchart showing an operation of an error handling addition means 42.

FIG. 21 is a flowchart showing an operation corresponding to Step ST306, performed by the error handling addition means 42 in FIG. 18.

In Step ST400, the error handling addition means 42 sets the message sequence information until the one element acquired in Step ST301 occurs, as the work object message sequence information, and the process goes to Step ST401.

In Step ST401, information that the phenomenon corresponding to the one element acquired in Step ST301 occurs is added to the work object message sequence information, and the process goes to Step ST402.

In Step ST402, information on an error handling caused by the phenomenon corresponding to the one element acquired in Step ST301 is taken out from the error handling deriving means 45, and the process goes to Step ST403.

In Step ST403, judgment is made on whether the information on the error handling is taken out or not. When the information is taken out, the process goes to Step ST404, and when the information is not taken out, the process goes to Step ST409.

In Step ST404, judgment is made on whether a configuration control condition is set or not in the information on the error handling acquired in Step ST402. When a configuration control condition is set, the process goes to Step ST405, and when no configuration control condition is set, the process goes to Step ST406.

In Step ST405, a device/configuration control information adding process is performed, and the process goes to Step ST406.

In Step ST406, an execution condition for the action set for the phenomenon, which is included in the error handling acquired in Step ST402, is checked, and the process goes to Step ST407.

In Step ST407, whether the execution condition for the action is satisfied or not is checked. When the execution condition is satisfied, the process goes to Step ST408, and when the execution condition is not satisfied, the process goes to Step ST402.

In Step ST408, the acquired error handling is added to the one element in the work object message sequence information, and the process goes to Step ST402.

In Step ST409, the work object message sequence information to which the corresponding error handling is added is outputted as error handling-added message sequence information 400 to the output device 5.

Figure 22:
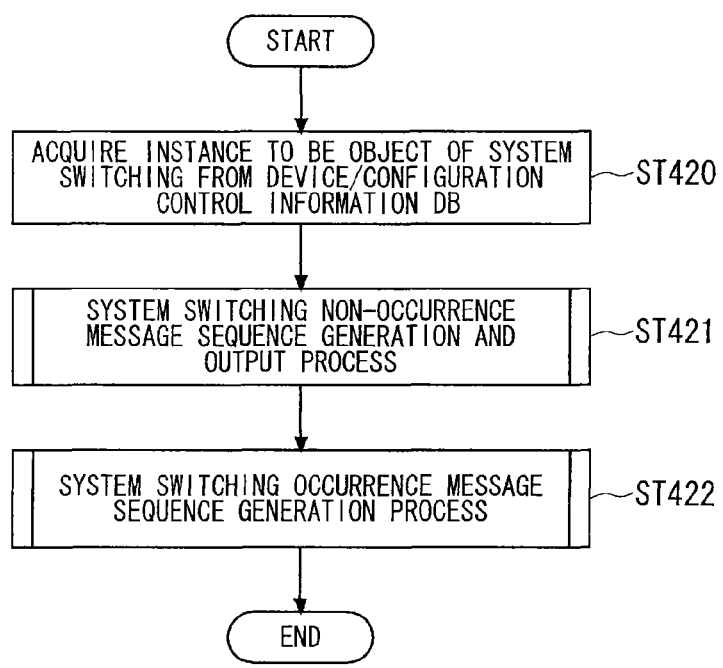
FIG. 22 is a flowchart showing an operation of the error handling addition means 42.

FIG. 22 is a flowchart showing the detailed operation of Step ST405 in FIG. 21 (the device/configuration control information adding process) performed by the error handling addition means 42.

In Step ST420, the error handling addition means 42 acquires an instance which is an object of system switching from the device/configuration control information DB 43, and the process goes to Step ST421.

In Step ST421, a system switching non-occurrence message sequence generation and output process is performed, and the process goes to Step ST422. In Step ST422, a system switching occurrence message sequence generation process is performed, and the operation is ended.

Figure 23:
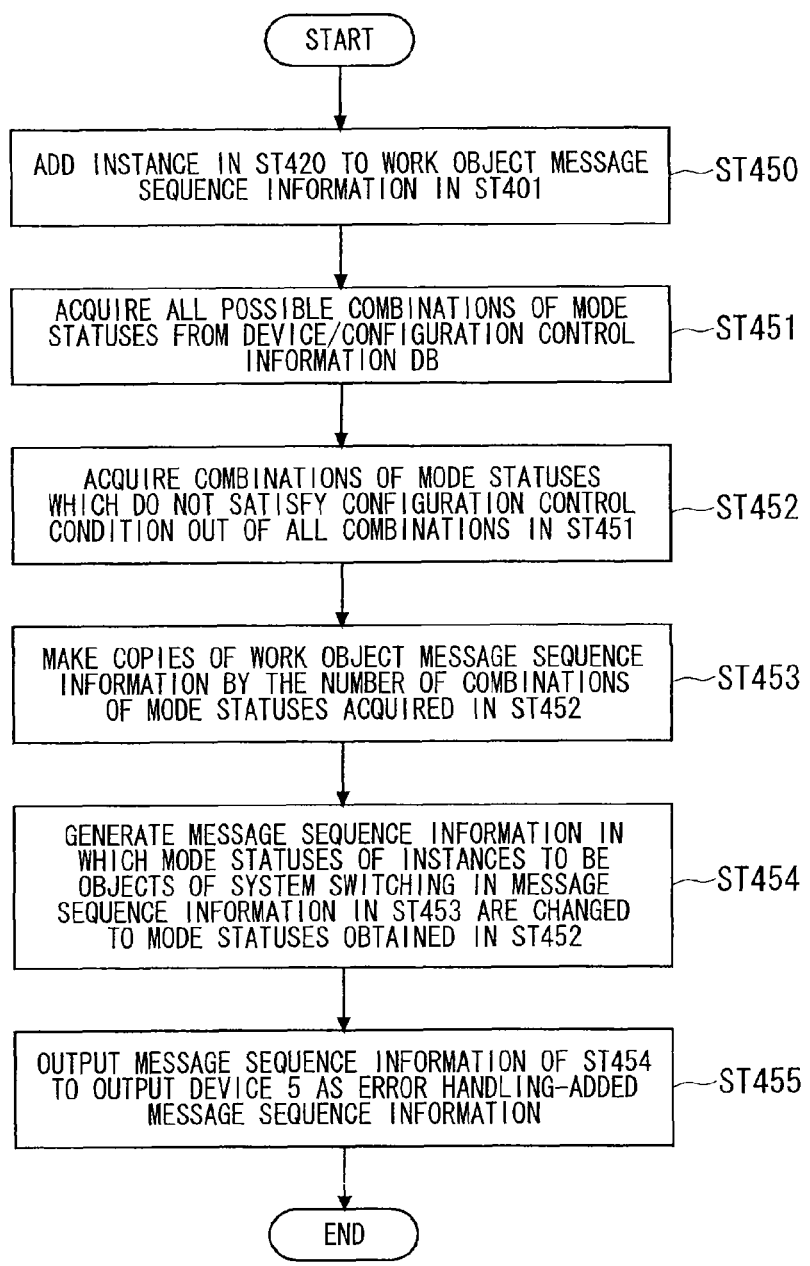
FIG. 23 is a flowchart showing an operation of the error handling addition means 42.

FIG. 23 is a flowchart showing the detailed operation of Step ST421 in FIG. 22 (the system switching non-occurrence message sequence generation and output process) performed by the error handling addition means 42.

In Step ST450, the error handling addition means 42 adds the instance in Step ST420 to the work object message sequence information in Step ST401, and the process goes to Step ST451.

In Step ST451, all combinations of possible mode statuses are acquired from the device/configuration control information DB 43, and the process goes to Step ST452.

In Step ST452, combinations of mode statuses which do not satisfy the configuration control condition are acquired out of all the combinations acquired in Step ST451, and the process goes to Step ST453. In Step ST453, copies of the work object message sequence information are made by the number of combinations of mode statuses which are acquired in Step ST452, and the process goes to Step ST454.

In Step ST454, pieces of message sequence information in which the respective mode statuses of the instances which are the objects of system switching in the pieces of message sequence information in Step ST453 are changed to the mode statuses acquired in Step ST452 are generated, and the process goes to Step ST455.

In Step ST455, the pieces of message sequence information in Step ST454 are outputted as the error handling-added message sequence information 400 to the output device 5, and the operation is ended.

Figure 24:
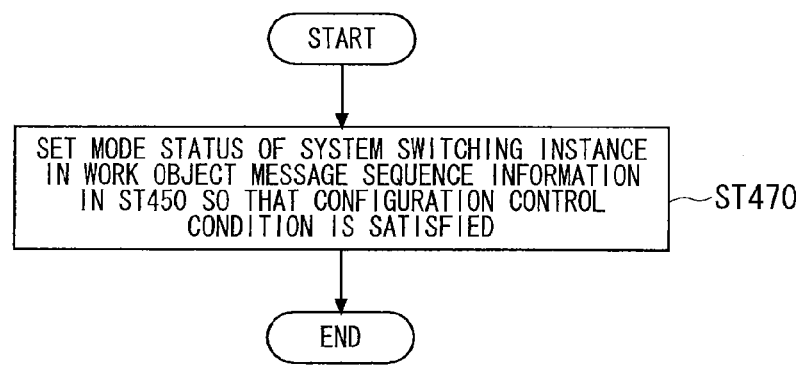
FIG. 24 is a flowchart showing an operation of the error handling addition means 42.

FIG. 24 is a flowchart showing the detailed operation of Step ST422 in FIG. 22 (the system switching occurrence message sequence generation process) performed by the error handling addition means 42.

In Step ST470, the error handling addition means 42 sets the mode status of the instance which is an object of system switching in the work object message sequence information in Step ST450 so that the configuration control condition is satisfied, and the operation is ended.

Figure 25:
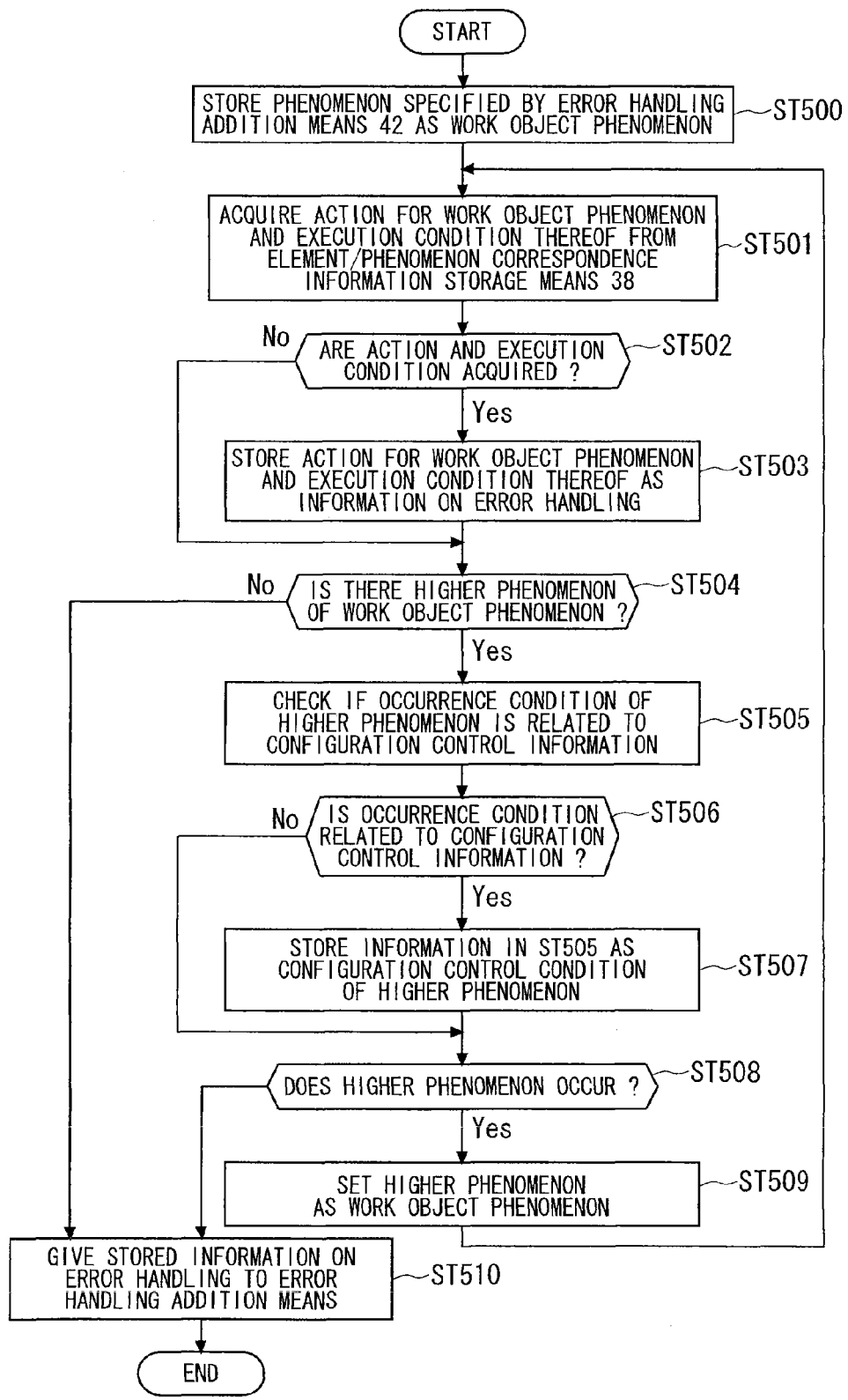
FIG. 25 is a flowchart showing an operation of an error handling deriving means 45.

FIG. 25 is a flowchart showing an operation of the error handling deriving means 45 shown in FIG. 18.

In Step ST500, the error handling deriving means 45 stores the phenomenon specified by the error handling addition means 42, i.e., the phenomenon corresponding to the one element in the work, object message sequence information, as a work object phenomenon, and the process goes to Step ST501.

In Step ST501, an action for the work object phenomenon and an execution condition thereof are acquired from the element/phenomenon correspondence information storage means 38, and the process goes to Step ST502.

In Step ST502, whether the action for the work object phenomenon and the execution condition thereof are acquired or not is checked. When the action and the execution condition are acquired, the process goes to Step ST503, and when the action and the execution condition are not acquired, the process goes to Step ST504.

In Step ST503, the action for the work object phenomenon and the execution condition thereof are stored as information on an error handling, and the process goes to Step ST504.

In Step ST504, judgment is made on whether there is a higher phenomenon of the work object phenomenon or not. When there is a higher phenomenon of the work object phenomenon, the process goes to Step ST505, and when there is no higher phenomenon, the process goes to Step ST510.

In Step ST505, whether an occurrence condition of the higher phenomenon is related to configuration control information or not is checked, and the process goes to Step ST506.
In Step ST506, judgment is made on whether the occurrence condition is related to the configuration control information or not. When the occurrence condition is related to the configuration control information, the process goes to Step ST507, and when the occurrence condition is not related to the configuration control information, the process goes to Step ST508.

In Step ST507, the information in Step ST505 is stored as the configuration control condition of the higher phenomenon, and the process goes to Step ST508.

In Step ST508, judgment is made on whether the higher phenomenon occurs or not. When the higher phenomenon occurs, the process goes to Step ST509, and when the higher phenomenon does not occur, the process goes to Step ST510.

In Step ST509, the higher phenomenon is set as the work object phenomenon, and the process goes to Step ST501.

In Step ST510, the information on the error handling which is stored is given to the error handling addition means 42.

<B-3. Exemplary Operation>

With reference to FIGS. 26 to 29, discussion will be made on exemplary operations of the second preferred embodiment.

Figure 26:
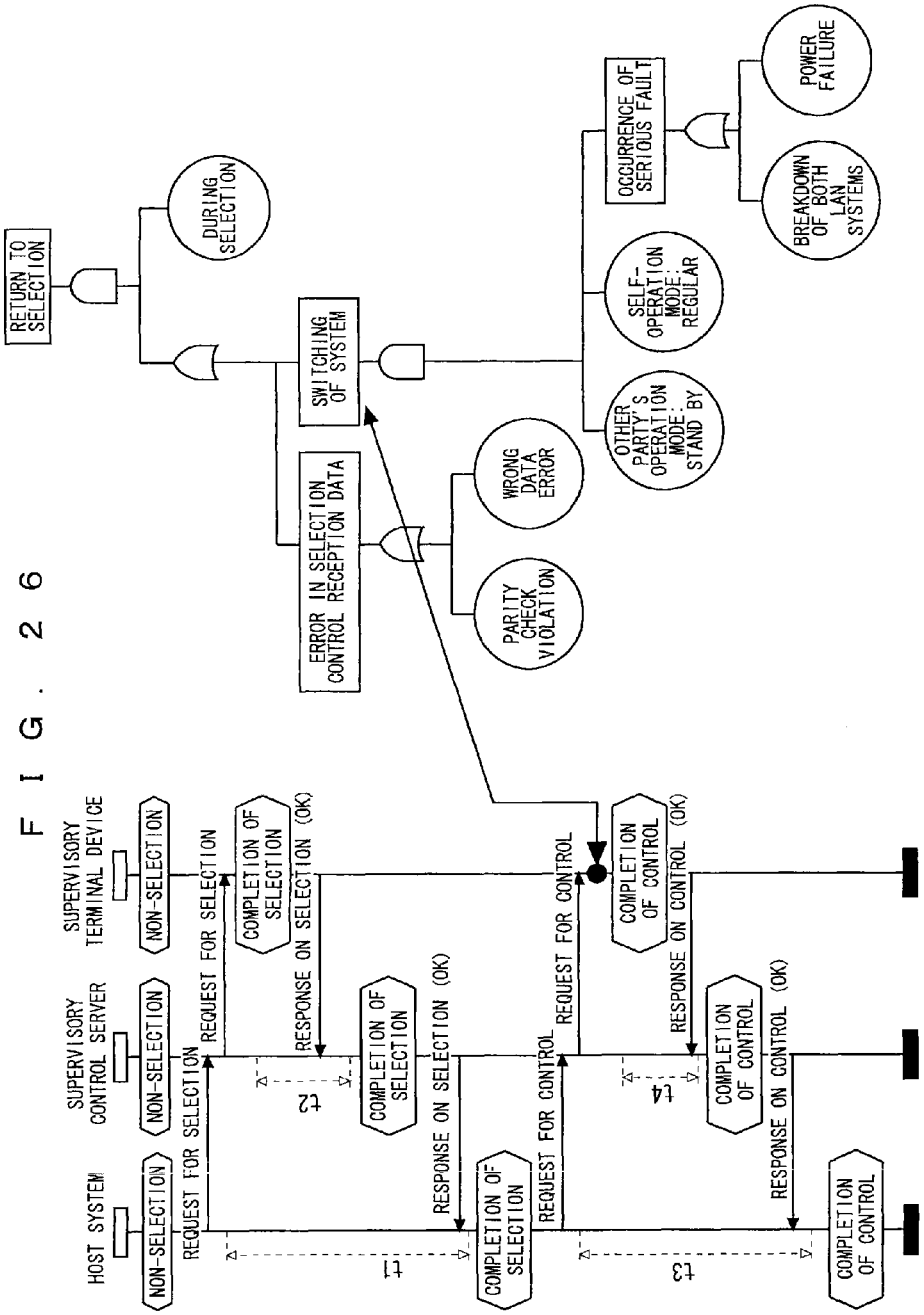
FIG. 26 is a view showing an exemplary input and an exemplary correspondence in accordance with the second preferred embodiment.

FIG. 26 is a view showing an exemplary input and an exemplary correspondence in accordance with the second preferred embodiment of the present invention.

A point (one element) indicated by a black circle in the message sequence information 31 is associated with a phenomenon of "serious fault" in the phenomenon causal relationship model 33.

Figure 27:
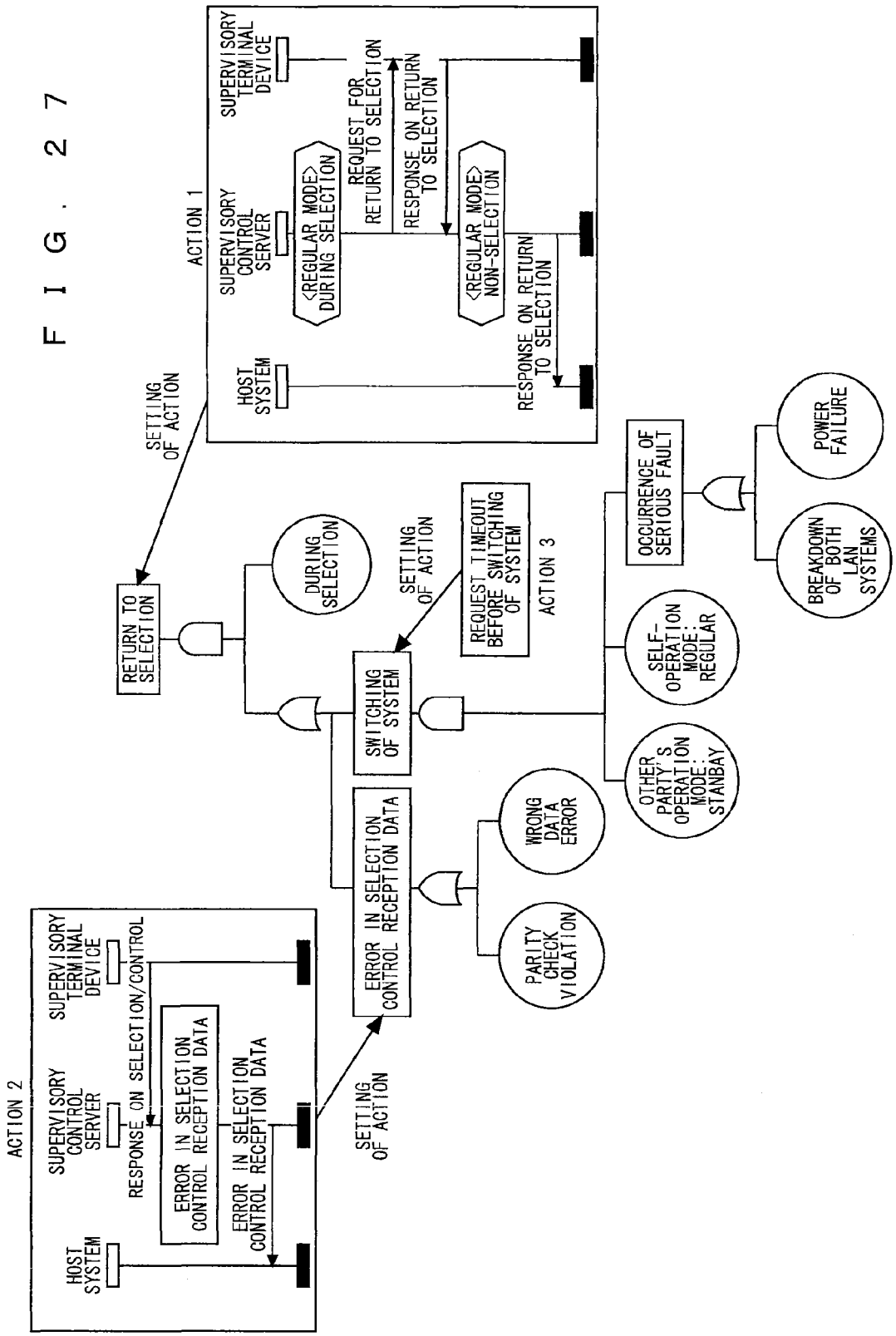
FIG. 27 is a view showing an exemplary action setting in accordance with the second preferred embodiment.

FIG. 27 is a view showing an exemplary action setting in accordance with the second preferred embodiment of the present invention. The device/configuration control information DB 43 is, for example, one shown in FIG. 21.

Actions ("action 1", "action 2", and "action 3") set for the phenomena are added to the elements ("return to selection", "error in selection control reception data", and "system switching") which are associated.

Figure 28:
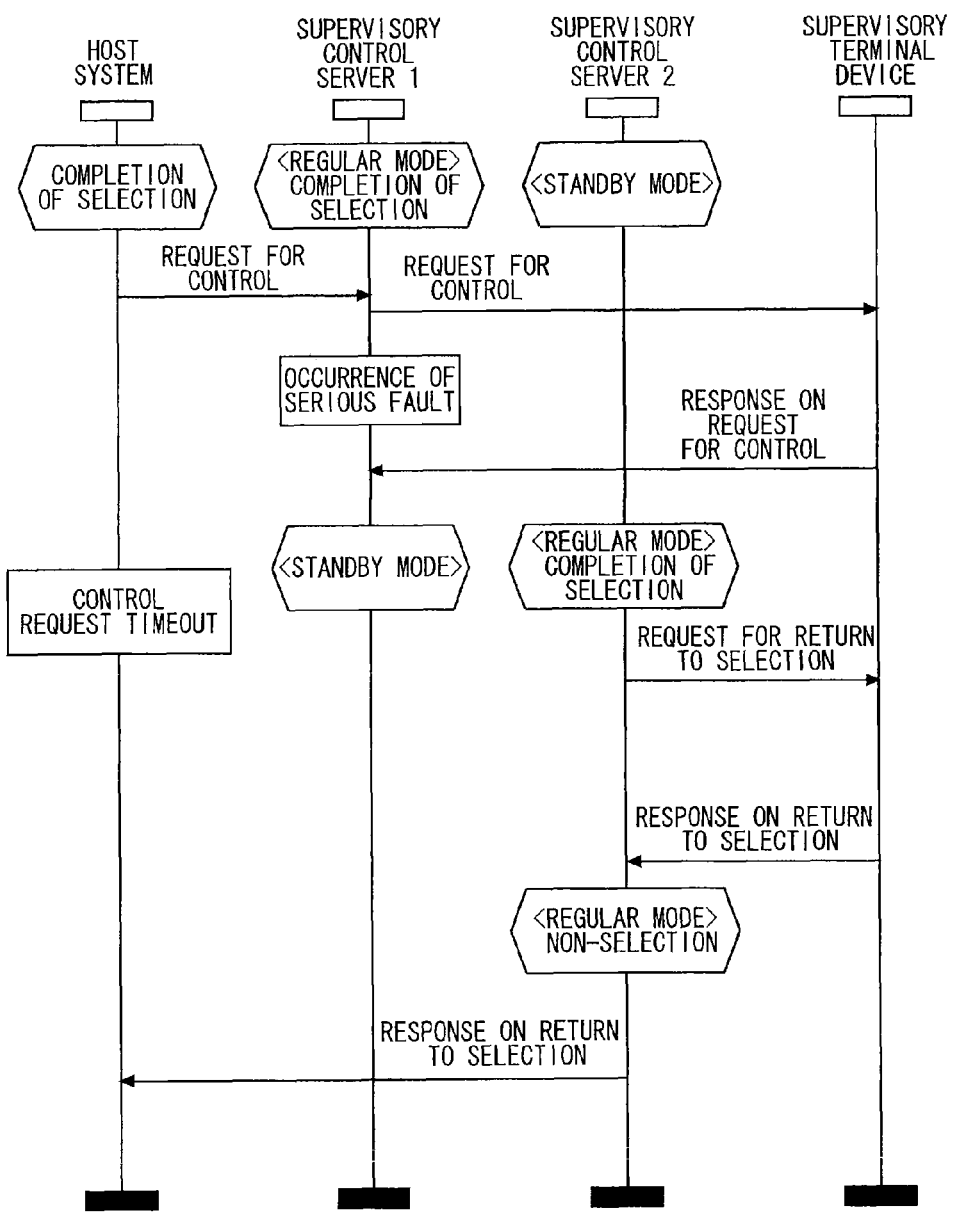
FIG. 28 is a view showing an exemplary output in accordance with the second preferred embodiment.

FIG. 28 is a view showing an exemplary output of system switching occurrence message sequence information in Step ST409. A supervisory control server 1 and a supervisory control server 2 are in the regular mode and the standby mode, respectively.

Figure 29:
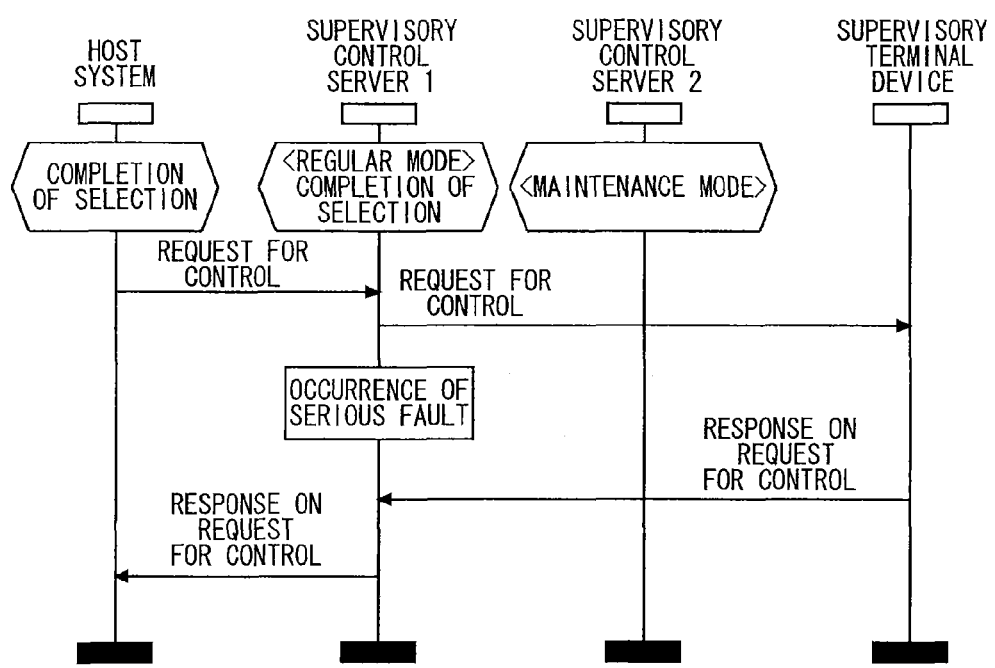
FIG. 29 is a view showing an exemplary output in accordance with the second preferred embodiment.

FIG. 29 is a view showing an exemplary output of system switching non-occurrence message sequence information in Step ST445.

<B-4. Effects>

In the second preferred embodiment of the present invention, the message sequence generation method further includes a step of (h) storing the device/configuration control information including the mode information of each instance in the message sequence information 31, and the step (b) of preparing the phenomenon causal relationship model 33 is a step of preparing the phenomenon causal relationship model 33 including description of a phenomenon accompanied by switching of the mode of each instance and the step (f) of adding the action set for the phenomenon corresponding to each element and the action set for another phenomenon caused by the phenomenon to each element as an error handling on the basis of the stored element/phenomenon correspondence information is a step of adding the action set for the phenomenon accompanied by a mode and the action set for another phenomenon caused by the phenomenon to the corresponding element as an error handling on the basis of the stored device/configuration control information. It is therefore possible to efficiently generate a message sequence diagram with an error handling added thereto even when an error handling requiring the system switching occurs.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1 PC, 2 CPU, 3 memory device, 4 input device, 5 output device, 31, 400 message sequence information, 32 correspondence result output means, 33 phenomenon causal relationship model, 34 action input means, 35 element/phenomenon correspondence information generation means, 36 element/phenomenon input means, 37, 42 error handling addition means, 38 element/phenomenon correspondence information storage means, 39, 45 error handling deriving means, 40 error handling-added message sequence information, 41, 44 message sequence generation device, 43 device/configuration control information DB, 61 start-of-instance symbol, 62 instance name, 63 lifeline, 64 end-of-instance symbol, 65 message symbol, 66 message name, 67 timer symbol, 68 timer information, 69 status symbol, 70 internal action symbol, 81 top phenomenon, 82 logical AND (logical product), 83 logical OR (logical sum), 84 intermediate phenomenon 85 basic phenomenon.

The invention claimed is:

1. A message sequence generation method comprising the steps of:
   (a) preparing message sequence information indicating a normal procedure of a communication protocol by using a message sequence diagram, for data processing;
   (b) preparing a phenomenon causal relationship model describing a plurality of phenomena including a phenomenon which requires an error handling together with a causal relationship thereof, for data processing;
   (c) setting an action for a specific phenomenon in said phenomenon causal relationship model, said action being performed when said specific phenomenon occurs;
   (d) associating each element in said message sequence information with each of said phenomena to generate element/phenomenon correspondence information;
   (e) storing said element/phenomenon correspondence information into a memory device; and
   (f) acquiring said action set for said phenomenon corresponding to said each element and said action set for another phenomenon caused by said phenomenon, from said element/phenomenon correspondence information, and adding said actions to said each element as an error handling,
   wherein said steps are executed through data processing by a computer.

2. The message sequence generation method according to claim 1, wherein
   said step (b) is a step of preparing said phenomenon causal relationship model escribing said causal relationship by using a logical symbol, for data processing.

3. The message sequence generation method according to claim 1, wherein
   said step (b) is a step of preparing said phenomenon causal relationship model describing one or a plurality of basic phenomena and one or a plurality of error phenomena caused by said one or said plurality of basic phenomena as said phenomena, for data processing.

4. The message sequence generation method according to claim 1, wherein
   said step (f) is a step of adding said error handling on the basis of a status of each instance in said message sequence information.

5. The message sequence generation method according to claim 1, further comprising a step of
   (h) storing device/configuration control information including mode information of each instance in said message sequence information,
   wherein said step (b) is a step of preparing said phenomenon causal relationship model including description of a phenomenon accompanied by a mode of said each instance, for data processing, and
   said step (f) is a step of acquiring said action set for said phenomenon accompanied by a mode and said action set for another phenomenon caused by said phenomenon, from said device/configuration control information which is stored, and adding said actions to corresponding said each element as an error handling.

6. The message sequence generation method according to claim 1, wherein
   said message sequence diagram includes at least one of transmission and reception of a message, an internal action, and firing of a timer.

7. The message sequence generation method according to claim 1, wherein
   said each element is automatically associated with a phenomenon in a group corresponding to said each element by using element definition information indicating a group including said each element and phenomenon definition information indicating a group including each phenomenon in said step (d).

8. A message sequence generation device for generating a message sequence on the basis of message sequence information indicating a normal procedure of a communication protocol by using a message sequence diagram and a phenomenon causal relationship model describing a plurality of phenomena including a phenomenon which requires an error handling together with a causal relationship thereof, comprising:
   a processing circuitry
   to set an action for a specific phenomenon in said phenomenon causal relationship model, said action being performed when said specific phenomenon occurs;
   to associate each element in said message sequence information with each of said phenomena to generate element/phenomenon correspondence information;
   to store said element/phenomenon correspondence information; and
   to add said action set for said phenomenon corresponding to said each element and said action set for another phenomenon caused by said phenomenon to said each element as an error handling from said element/phenomenon correspondence information.

* * * * *